Figure 1:
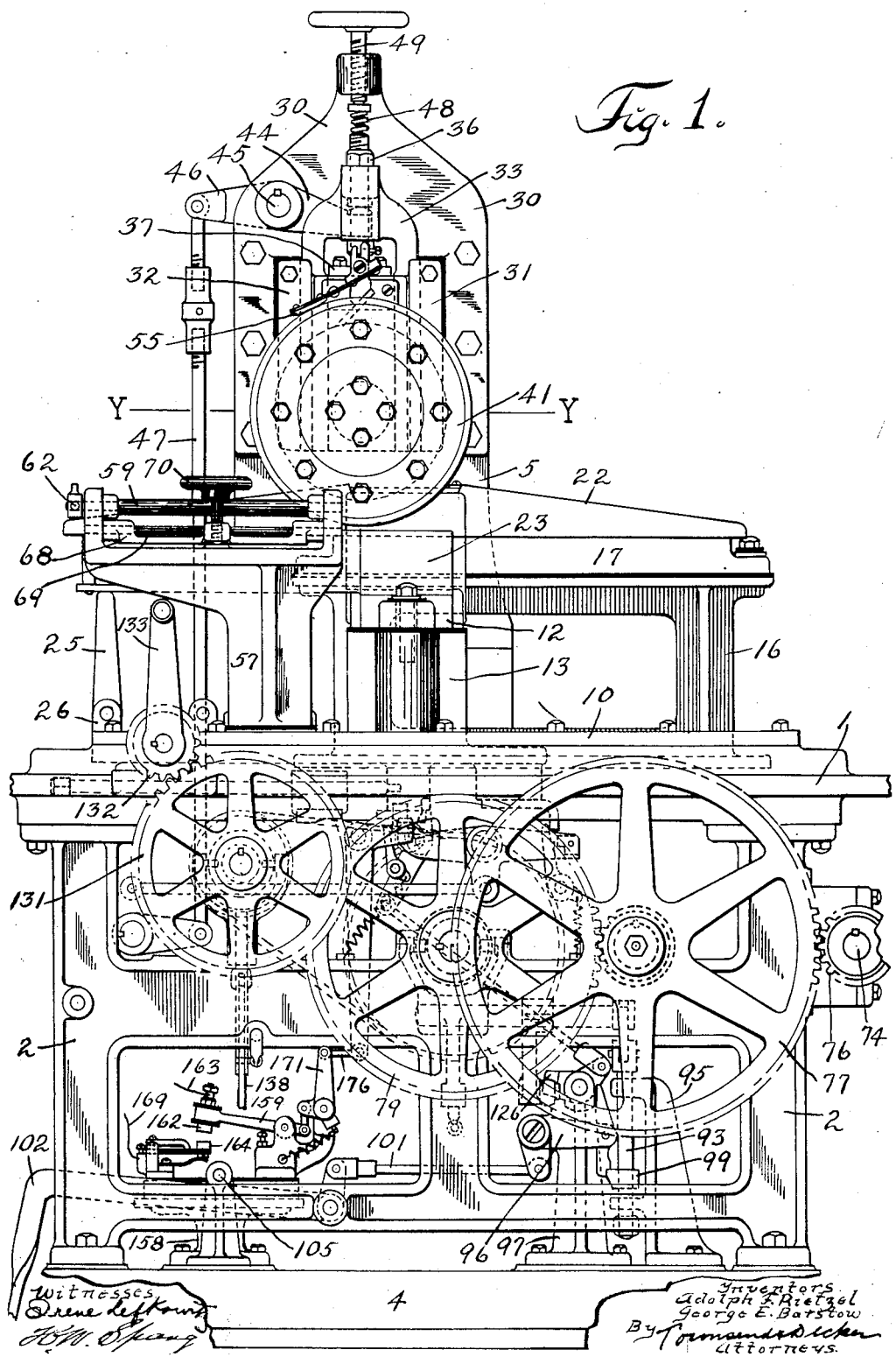

A. F. RIETZEL & G. E. BARSTOW.
ELECTRIC METAL WORKING APPARATUS.
APPLICATION FILED NOV. 20, 1908.

1,133,578. Patented Mar. 30, 1915.
12 SHEETS—SHEET 1.

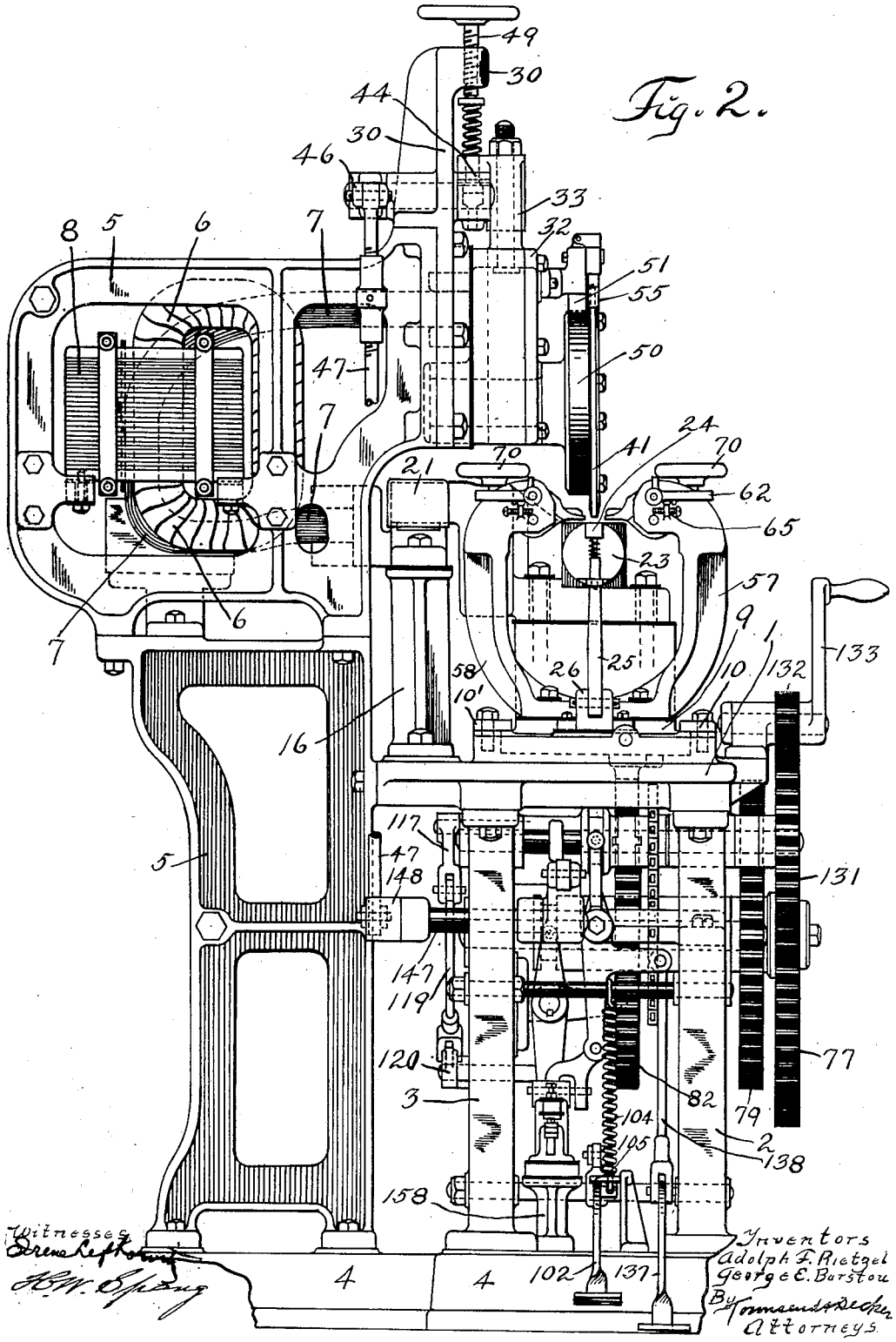

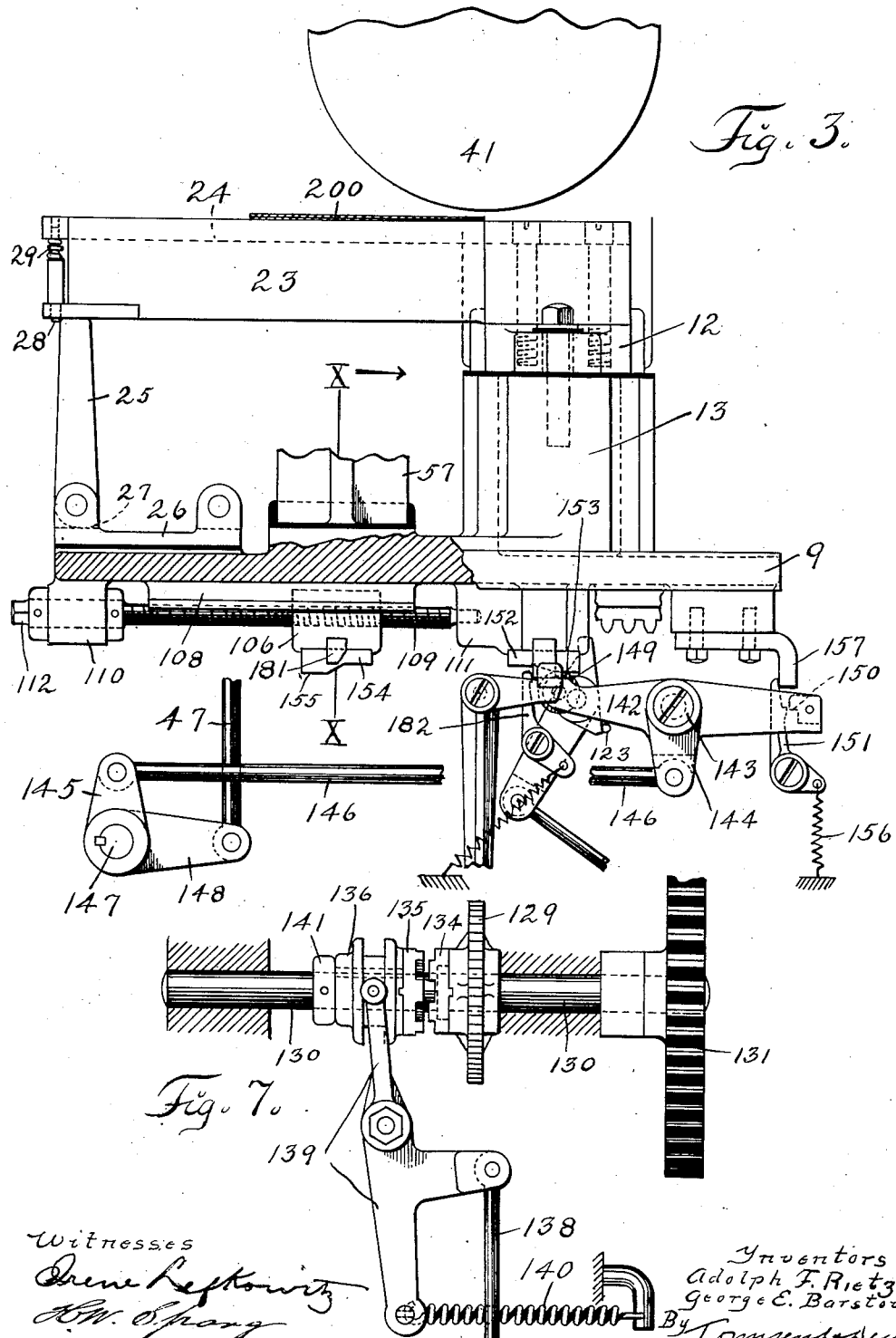

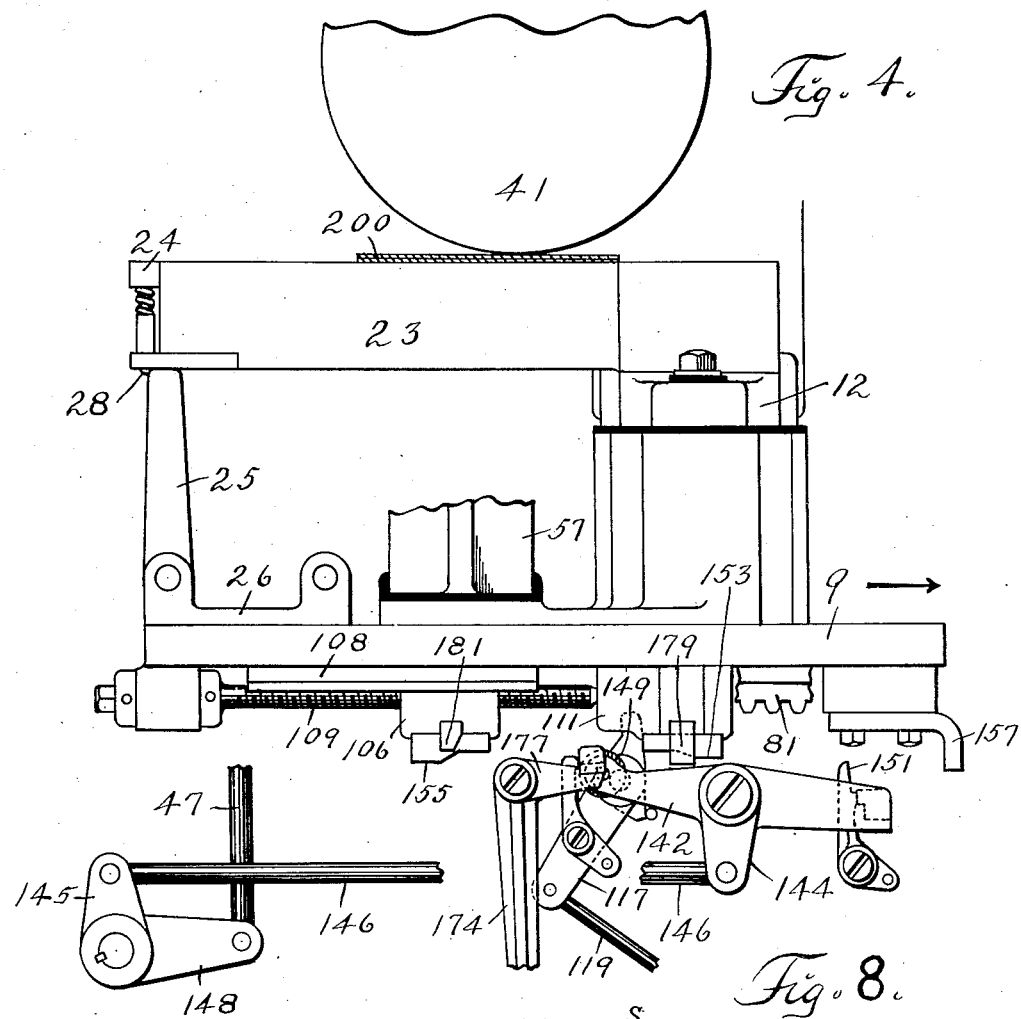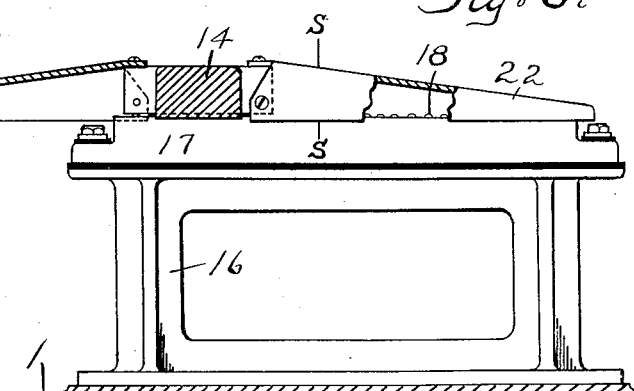

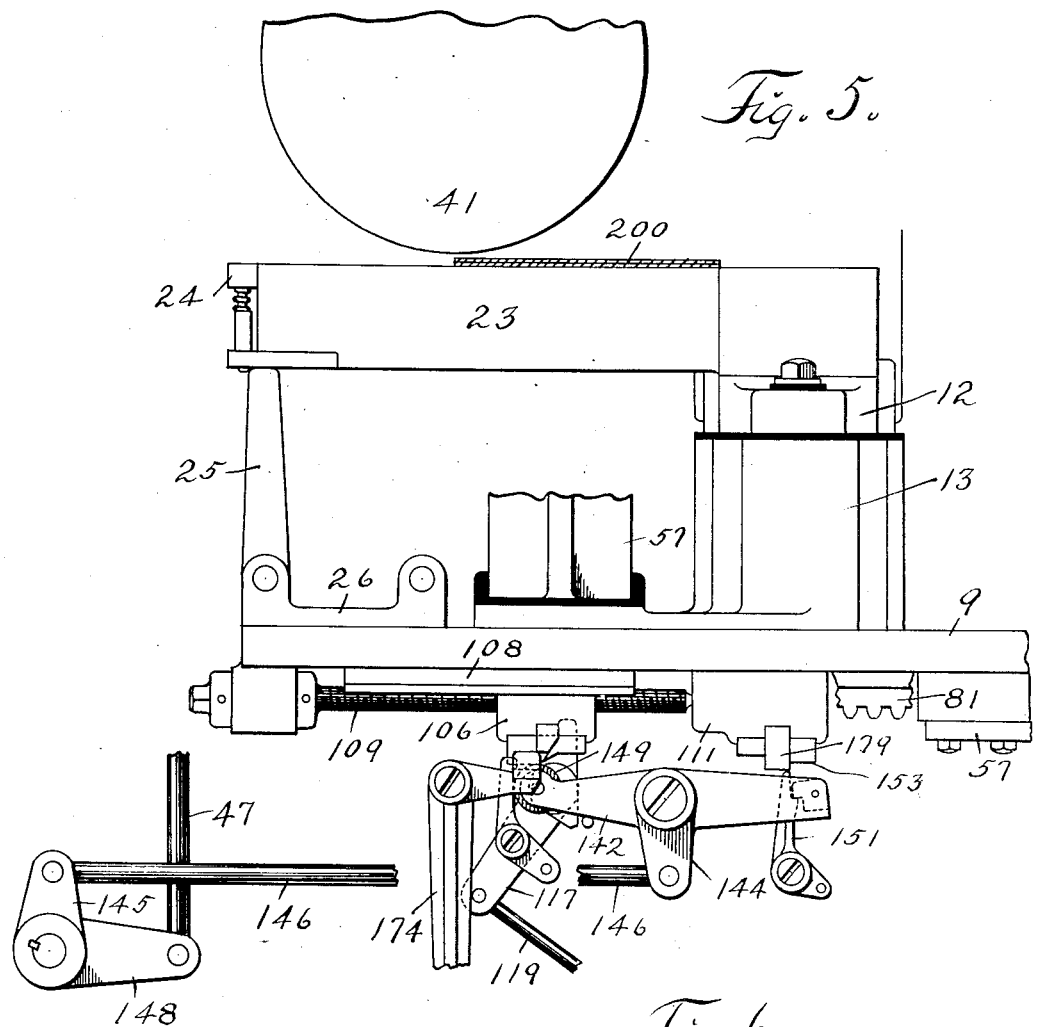
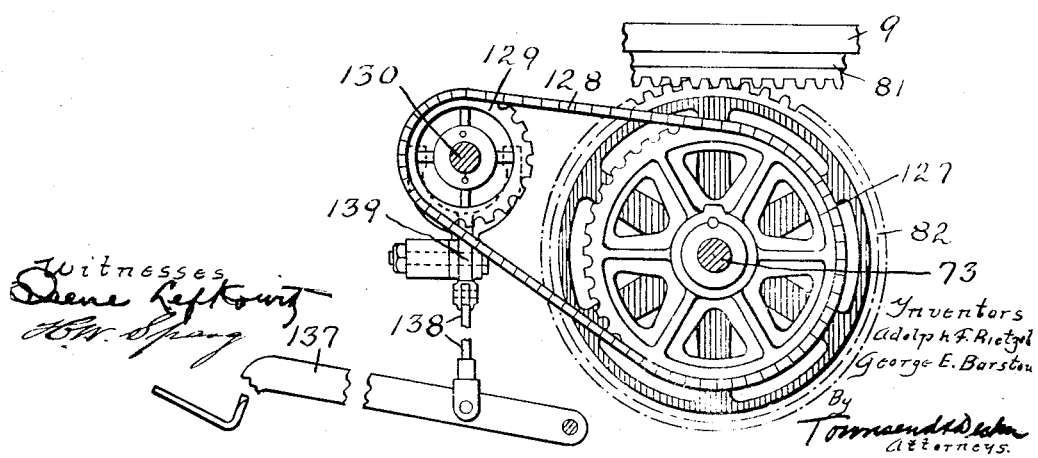

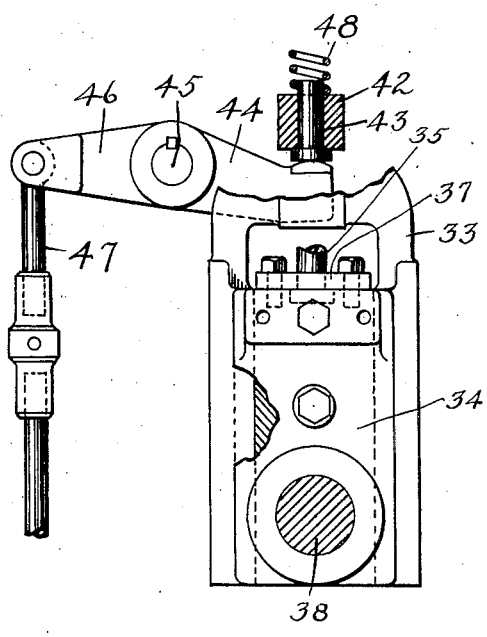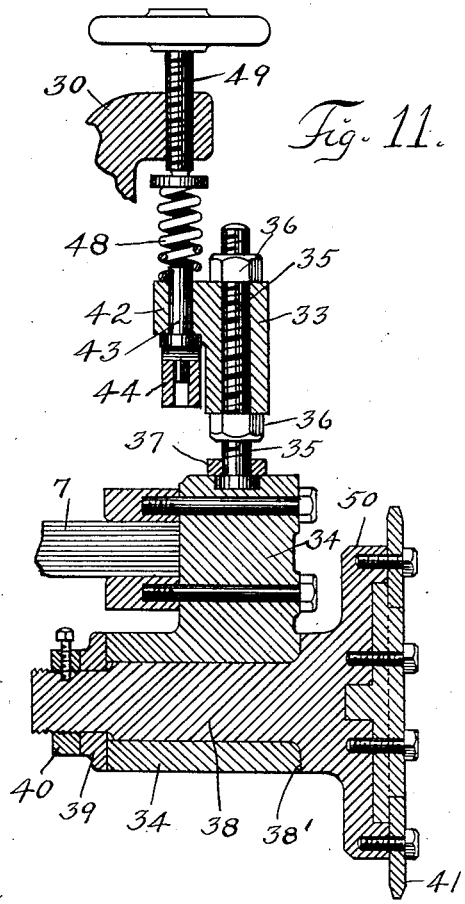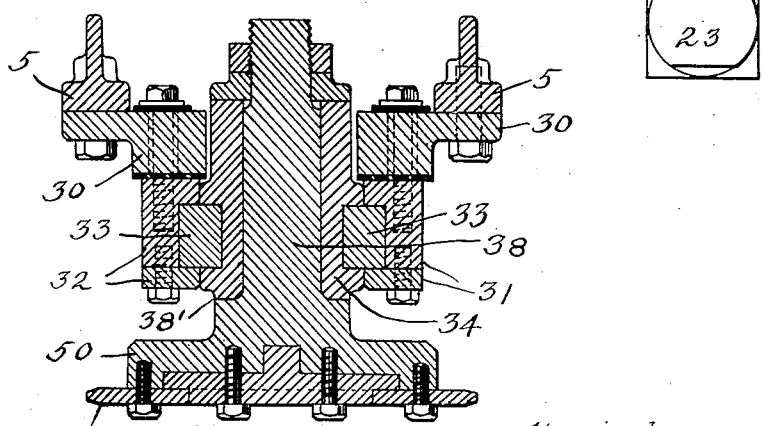

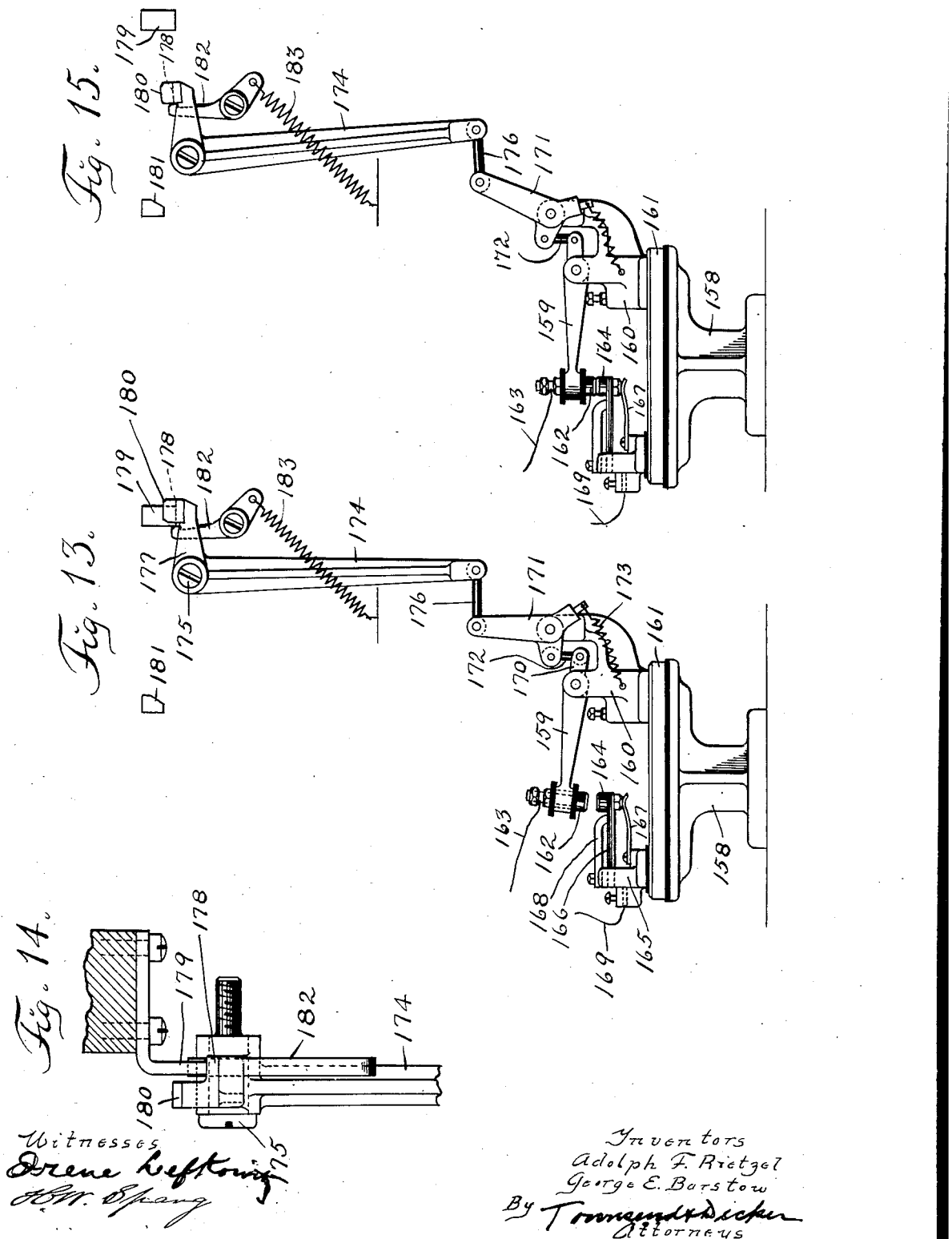

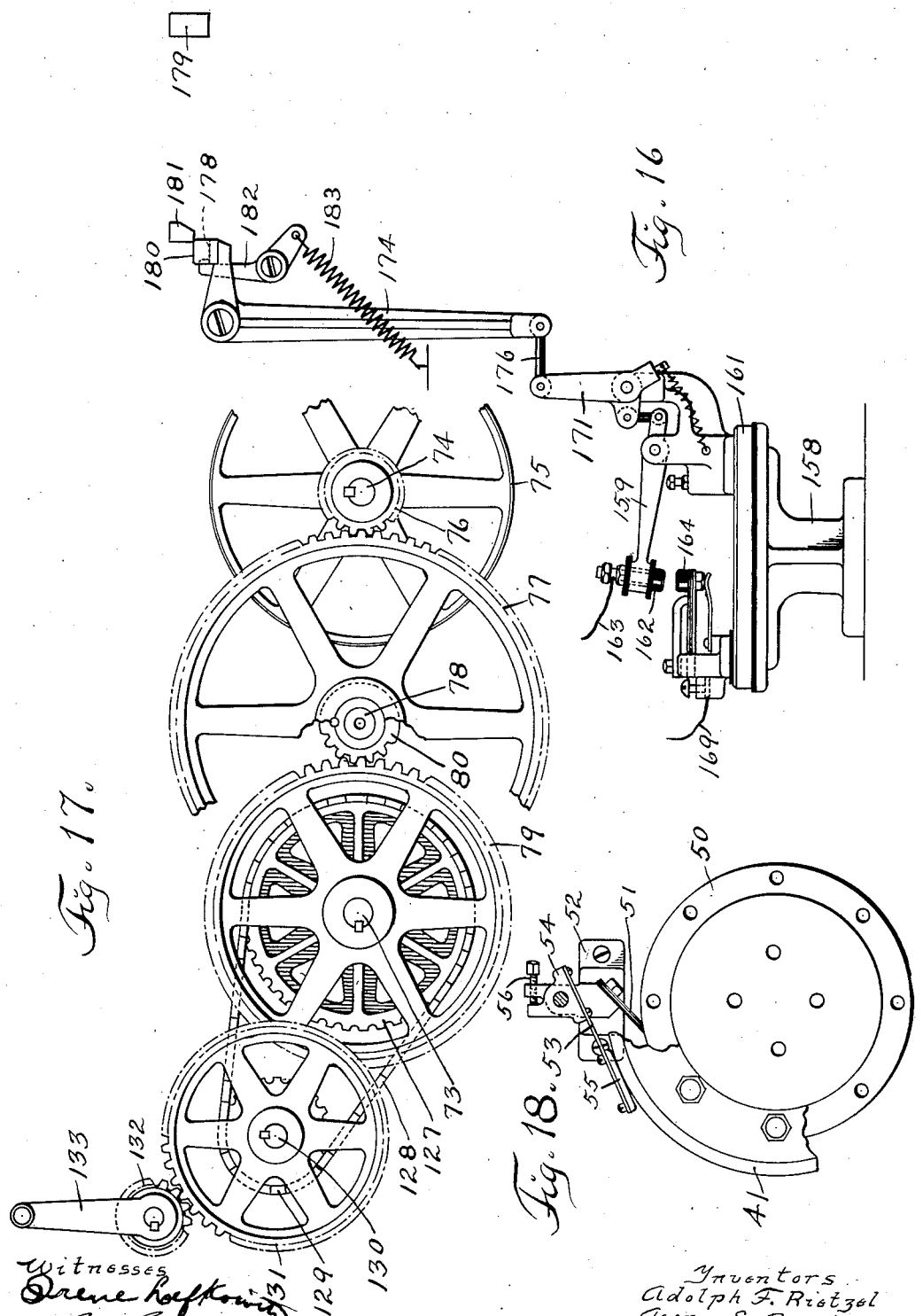

A. F. RIETZEL & G. E. BARSTOW.
ELECTRIC METAL WORKING APPARATUS.
APPLICATION FILED NOV. 20, 1908.
1,133,578.
Patented Mar. 30, 1915.
12 SHEETS—SHEET 9.
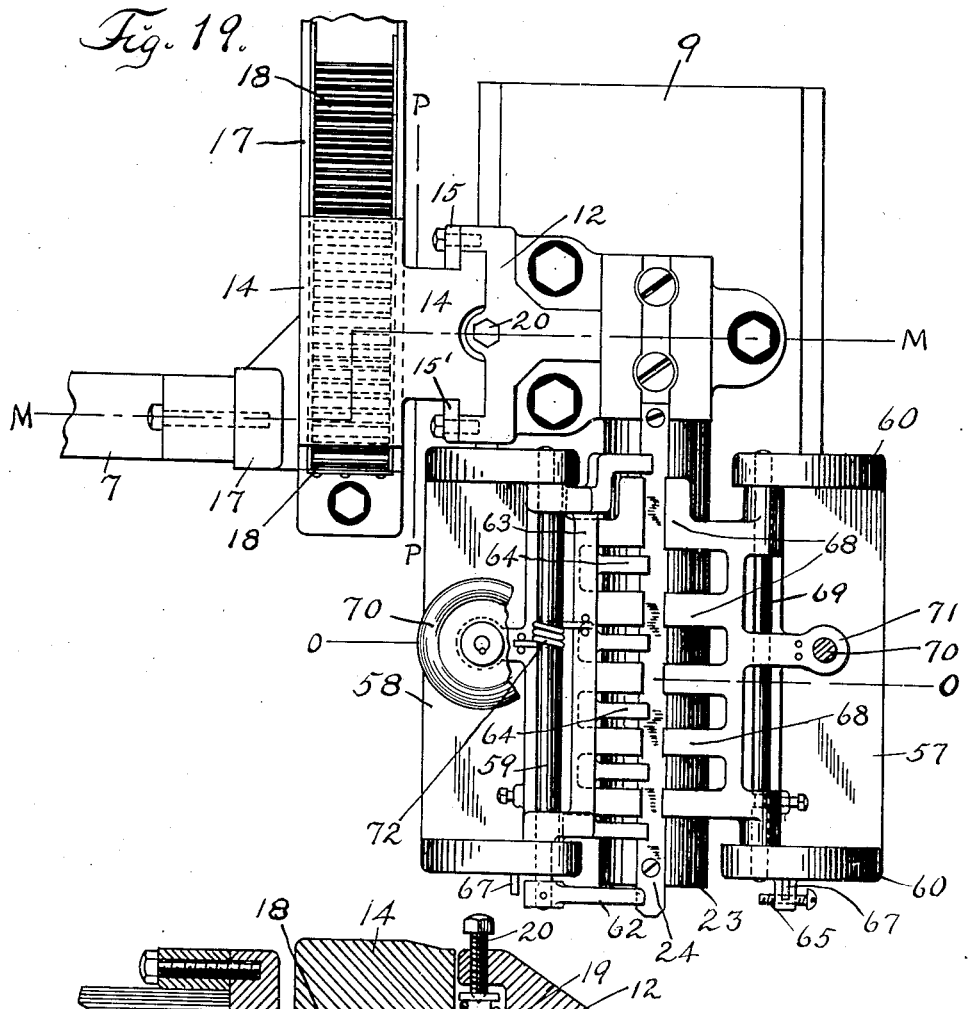
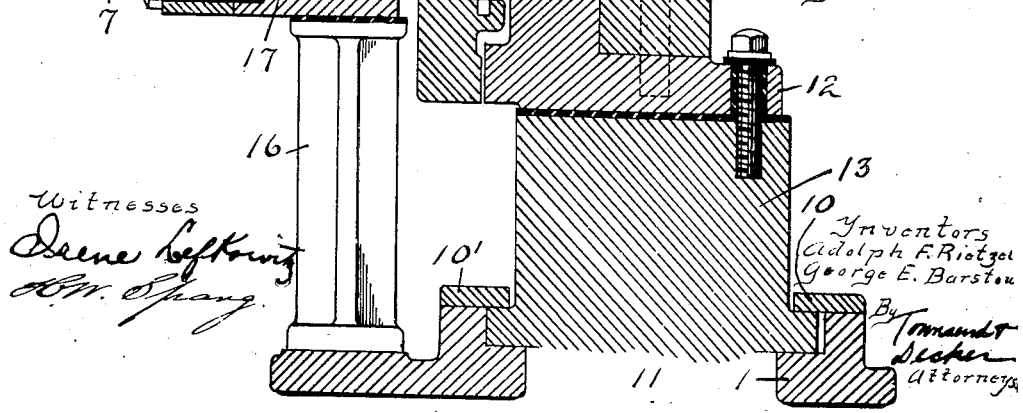

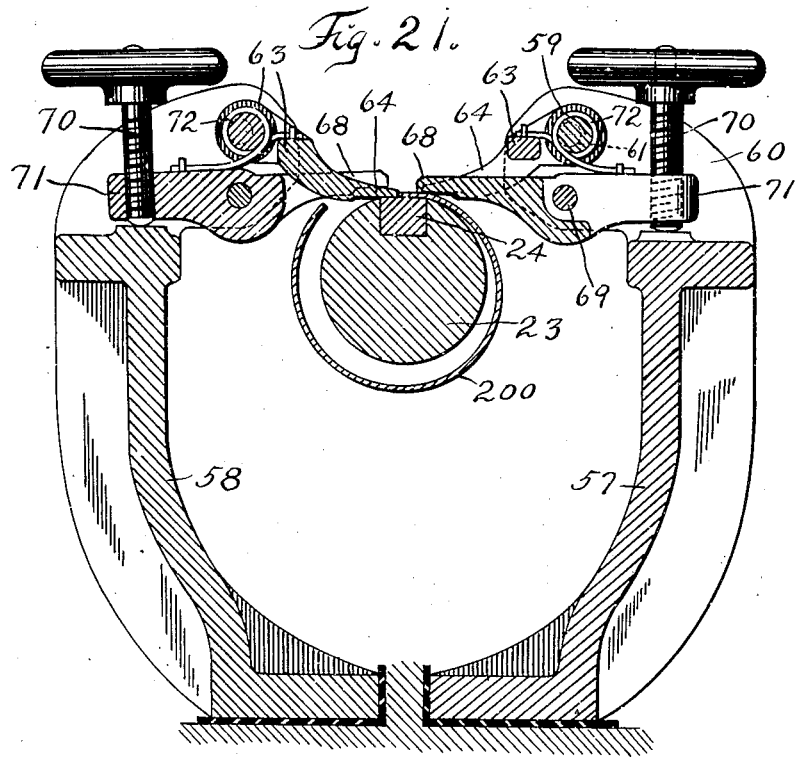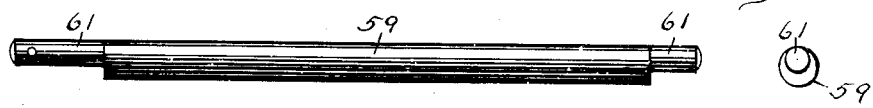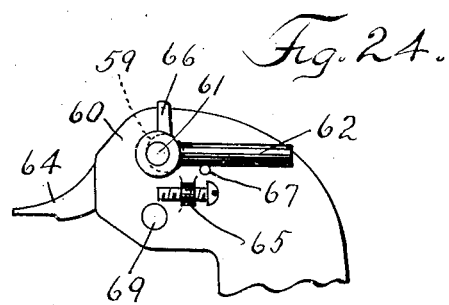

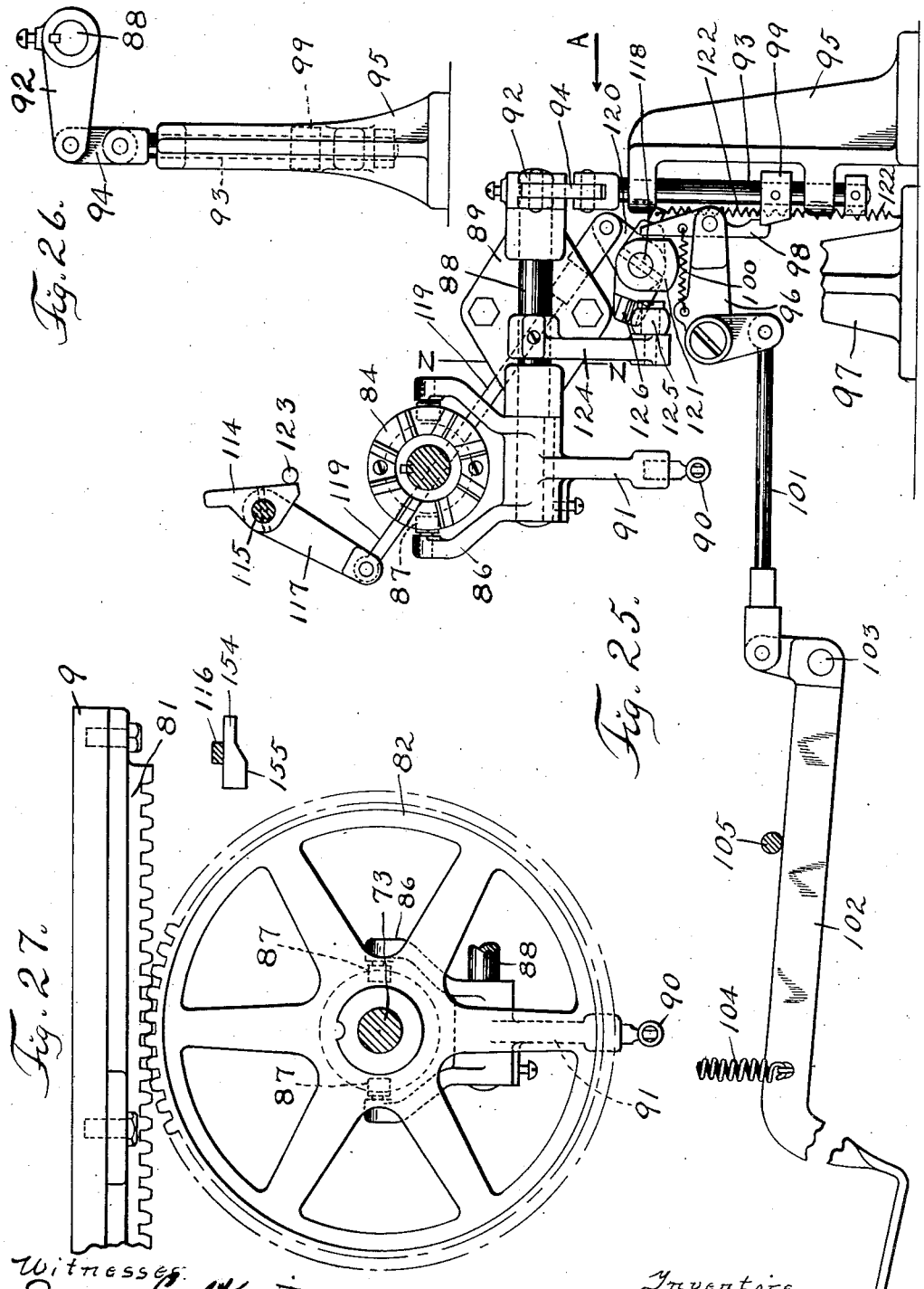

A. F. RIETZEL & G. E. BARSTOW.
ELECTRIC METAL WORKING APPARATUS.
APPLICATION FILED NOV. 20, 1908.

1,133,578.

Patented Mar. 30, 1915.
12 SHEETS—SHEET 12.

Witnesses
Irene Lefkowitz
H. W. Spang

Inventors
Adolph F. Rietzel
George E. Barstow
By Townsend & Decker
Attorneys

UNITED STATES PATENT OFFICE.

ADOLPH F. RIETZEL, OF CHARLESTOWN, RHODE ISLAND, AND GEORGE E. BARSTOW, OF LYNN, MASSACHUSETTS, ASSIGNORS, BY MESNE ASSIGNMENTS, TO THOMSON ELECTRIC WELDING COMPANY, A CORPORATION OF MASSACHUSETTS.

ELECTRIC METAL-WORKING APPARATUS.

1,133,578.  Specification of Letters Patent.  Patented Mar. 30, 1915.

Application filed November 20, 1908. Serial No. 463,536.

*To all whom it may concern:*

Be it known that we, ADOLPH F. RIETZEL and GEORGE E. BARSTOW, citizens of the United States, and residents of Charlestown, in the county of Washington and State of Rhode Island, and Lynn, in the county of Essex and State of Massachusetts, respectively, have invented certain new and useful Improvements in Electric Metal-Working Apparatus, of which the following is a specification.

Our invention relates to an electric metal working apparatus wherein the work is heated to the desired extent by the passage of electric currents through the section of metal to be welded or otherwise operated upon.

The main object of our invention is to provide a machine in which the work to be welded or otherwise worked will be progressively fed through the machine at the same time that the heating current is caused to pass through the section to be welded or otherwise worked.

A further object is to provide a machine which will automatically feed the work to the heating contacts to form a continuous welded joint, and automatically control the passage of the heating current through the section of metal to be welded.

A special object of our invention is to provide a machine in which the seams of cans, pots or other sheet metal goods can be welded together by passing electric currents through the same at the same time that the work is progressively fed through the machine whereby the finished article will be smoother in appearance and cheaper to obtain than heretofore.

Our invention will herein be shown and described as applied to a machine for welding the seams of sheet metal cans or the like, but it will be understood that it is not limited to this application of it, as various other uses of the invention might be employed without departing from the spirit thereof.

To these ends our invention consists in providing an electric metal working apparatus with means whereby the section of work to be welded is progressively fed into engagement with the contacts together with means for maintaining the flow of electric current across the work from one contact to the other.

Our invention also consists in providing means for automatically cutting off the heating current when the work has been fed to a predetermined point, said means being controlled by the movement of the feeding mechanism.

Our invention also consists in providing a machine wherein the work is progressively fed to electric contacts with means whereby one of the contacts is automatically freed from the work after it has progressed and the weld effected for a predetermined distance.

The invention consists further in providing means whereby one of the contacts is held out of engagement with the work and means for releasing the contact from the holding means automatically controlled by the movement of the work to permit the contact to engage the work.

The invention consists still further in providing means for disengaging one contact from the work at a predetermined point in the movement of the work and in causing it to engage the work at another point, said engaging and disengaging of the contact with the work being automatically controlled by the movement of the work itself.

The invention consists still further in providing a single adjustment for controlling the time of automatic stopping of the feeding movement, stopping of the flow of heating current and disengaging of the contact.

The invention consists still further in a work-holder adapted to control both the closing and the breaking of the electric circuit providing the heating current. It also consists in means for holding the circuit open and a work-holder adapted to free said holding means and permit the circuit to be closed at a predetermined point in the movement of the work-holder.

The invention still further consists in providing an electric metal working apparatus with a traveling contact and a stationary contact, the traveling contact being adapted to feed the work into progressive engagement with the stationary contact.

The invention further consists in providing means for supporting the entire length of the work to be welded or otherwise worked, said support being adapted to travel to feed the work progressively to the other contact and in electrical connection with one terminal of the source of current supply during said travel.

The invention consists still further in means for clamping the work along the whole length of the weld and also in providing means for adjusting the edge, particularly for the amount of lap desired, in cases where a lap weld is to be made.

Our invention consists still further in the details of construction and combinations of parts hereinafter more particularly described and then specified in the claims.

Figure 28:
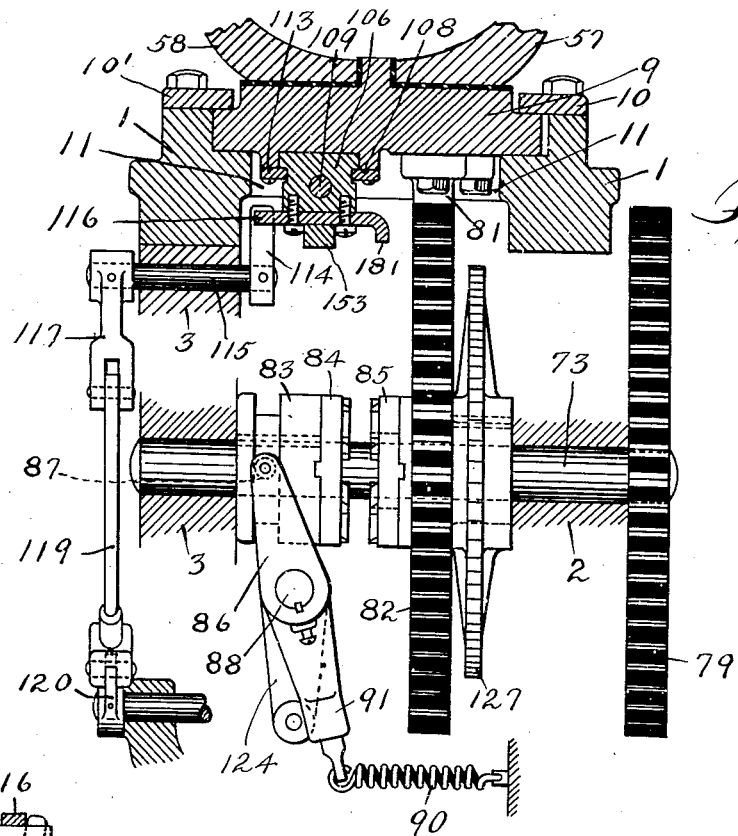
Figure 30:
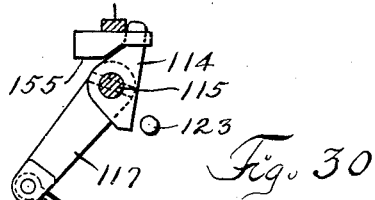
Figure 29:
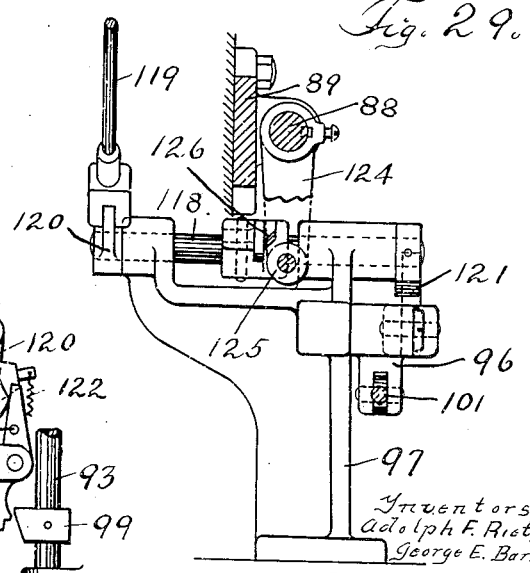

In the accompanying drawings, Figure 1 illustrates a front elevation of an electric metal working apparatus constructed in accordance with our invention. Fig. 2 is a side elevation of the same. Fig. 3 is an enlarged view of the traveling carriage, contact-raising devices and circuit controlling devices detached from the rest of the apparatus and shown in their position before beginning the forward movement of the carriage, parts being broken away. Fig. 4 is a similar view showing the various devices in their positions when the carriage has traveled part of its predetermined distance. Fig. 5 is a similar view showing the position of the devices after completing the weld or at the end of the forward travel of the carriage. Fig. 6 is a front elevation of the gear train and clutch for returning the carriage to its original position after completing the weld. Fig. 7 is a side elevation, on an enlarged scale, of the clutch and operating parts shown in Fig. 6. Fig. 8 is a front elevation and partial section of the device for maintaining electrical connection between the traveling carriage and one terminal of the transformer secondary, the section being taken on the line P P Fig. 19. Fig. 9 is a transverse section on the line S S Fig. 8. Fig. 10 is a front elevation of the slide for the upper contact and its supporting parts. Fig. 11 is an enlarged transverse vertical section through the upper or stationary contact and supporting parts. Fig. 12 is an enlarged horizontal transverse section through the upper or stationary contact taken on the line Y Y Fig. 1. Fig. 13 is a view of the circuit controller in open position, the controlling devices therefor being shown in the position when the carriage is about to commence its forward movement. Fig. 14 is an enlarged side view of the controlling devices for the circuit breaker. Fig. 15 is a similar view to Fig. 13, showing the circuit closer in closed position and the controlling devices in the position taken during the forward movement of the carriage. Fig. 16 is a similar view showing the circuit closer in open position, the controlling devices being shown in position taken when the carriage has reached the end of its forward movement. Fig. 17 is a front elevation of the entire gear train detached from the apparatus. Fig. 18 is a front elevation, parts being broken away, of the stationary contact, the brush connection therefor and the cleaner for the edge of the contact. Fig. 19 is an enlarged plan view of the carriage and work supporting and clamping parts one set of locating fingers being removed and the guards for the roller contacts being also omitted for clearness. Fig. 20 is a transverse vertical section on the line M M Fig. 19. Fig. 21 is an enlarged transverse vertical section on the line O O Fig. 19. Fig. 22 is a side elevation of the shaft for the locating devices. Fig. 23 is an end view of the same. Fig. 24 is an enlarged view of the means for adjusting the amount of lap for the weld. Fig. 25 is an enlarged detached view of the devices for controlling the travel of the carriage. Fig. 26 is an end view looking in the direction of the arrow A Fig. 25. Fig. 27 is an enlarged front elevation of the driving mechanism for the carriage. Fig. 28 is an enlarged transverse section through the carriage on the line X X Fig. 3, and showing the clutch and driving mechanism for propelling the carriage in side elevation. Fig. 29 is a transverse section taken on the line Z Z Fig. 25. Fig. 30 is a detached view of the mechanism for automatically disconnecting the carriage from the driving power, the mechanism being shown in the position taken after the carriage has been uncoupled.

In the preferred form of carrying out our invention in a machine in which it is desired to effect a lap weld in sheet metal goods as illustrated in the accompanying drawings, 1 indicates a table or platform supported upon a suitable framework, the front frame being indicated at 2 and the rear one at 3, the said frames being secured to and rising from a suitable base 4.

The source of electric energy adapted to supply heating current to the work might be of any desired type, but is here shown as a transformer provided with a flexible secondary such as is well-known in the art. The transformer is suitably secured to, but insulated from a frame 5 rising from the base 4 at the rear of the apparatus and consists of a primary 6 and a flexible secondary 7 constructed preferably of a number of thin copper strips, to the ends of which are secured the contacts which engage the work as will be hereinafter described. The laminated core for the transformer is indicated at 8.

A platen 9, hereinafter called a carriage, working in suitable guides 10, 10' secured to the table 1, travels forward and back over an opening 11 (see Fig. 28) in the table 1. Referring more particularly to Figs. 3, 8, 19 and 20, a bracket 12 secured to, but insulated from a post or standard 13 rising from the carriage 9 carries an overhanging slide 14 preferably secured to the bracket 12 by means of vertical guides 15, 15′ in which it is free to move vertically. The slide 14 travels forward and back with the carriage 9 on ways 17 supported by, but insulated from a bracket 16 mounted on the rear of the table 1. The ways 17 are secured to one terminal of the flexible secondary 7 of the transformer and are provided on the upper surface with a rack of copper rollers 18 upon which the overhanging portion of the slide 14 travels and through which it conducts heating current from one terminal of the secondary to the bracket 12. To allow for irregularities in the size of the copper rollers 18 and to insure that the slide will always be in contact with them throughout its travel, the slide 14 is preferably secured to the bracket 12 by the vertical guides 15, 15′ in which it can move vertically to follow whatever unevenness there may be in the rollers 18, the slide being continually pressed on the rollers by a spring 19 seated on a shoulder projecting from the slide 14 and compressed between it and the fixed bracket 12, a suitable adjusting screw 20 being provided to regulate the amount of pressure exerted on the rollers 18. Covers or guards 21, 22 preferably constructed of sheet metal, are secured to either end of the overhanging portion of the slide 14 and project longitudinally therefrom so that the roller contacts 18 will be protected from dust, dirt, etc., at all times irrespective of the position of the slide 14.

The work-holder or support for the work is mounted on and travels with the carriage 9 and when it is desired to weld the seam of a hollow article such as a can, the work-holder or support preferably takes the form of a horn or mandrel 23 constructed of some conducting material such as copper and preferably circular in cross-section. The horn or mandrel is provided with a squared end which seats in a recess formed in the bracket 12 to which it is firmly secured and in electrical connection therewith. The horn or mandrel 23, hereinafter called the work-holder or work support projects from the bracket 12 for a sufficient distance to provide support for the whole length of the seam to be welded. Preferably the work-holder is provided with a removable contact-shoe 24 secured in a groove therein and upon said shoe the seam is placed, so that, should the line of contact become worn or damaged, a new shoe could readily be inserted without being put to the expense of providing an entire new mandrel. The free end of the work-holder is supported by a removable post 25 pivotally mounted on a bracket 26 secured to but suitably insulated from the carriage 9. The post 25 is turned about its pivot and freed from the horn 23 to permit the insertion of the work after which it is turned back to engage the under side of the horn or mandrel 23, it being stopped in vertical position by a lug 27 striking the bracket 26. When the post 25 is returned to its supporting position, the free end thereof snaps under a catch 28 secured to the end of the horn, the catch being held extended by a spring 29 to prevent the post freeing itself from the mandrel.

By the construction described above, it will be seen that electrical connection is maintained between the work-holder or support 23 and one terminal of the flexible secondary 7 of the transformer.

Referring more particularly to Figs. 1, 2, 10, 11 and 12, 30 indicates a bracket mounted on the frames 5 and to the face of which is secured vertical guide-ways 31, 32, the said bracket being suitably insulated from the guide-ways as shown. An inverted U-shaped slide 33 working in the guide-ways 31, 32 moves transversely with respect to the line of travel of the work-support 23 and has secured to it a block of conducting material 34. The block 34 is secured to the slide 33 so that it travels with it, but it is also capable of being adjusted vertically on the slide. This vertical movement or adjustment is accomplished by providing the sides of the block 34 with vertical grooves in which the inner sides of the U-shaped slide 33 work and suspending the block within the slide. The block is rigidly secured to the slide 33 so that it practically becomes part thereof by a headed screw 35 secured to the slide 33 by suitable nuts 36, the head of the screw being seated in a recess in the top of the block 34 and secured thereto by a plate 37 fastened to the block 34 and provided with an opening through which the screw 35 passes. Adjustment of the position of the block 34 is attained by loosening the lower nut 36 and turning the upper nut in either direction to raise or lower the block as desired, after which the lower nut is jammed up and the block 34 becomes a rigid part of the slide 33. The block 34 is secured to the other terminal of the flexible secondary 7 of the transformer and in electrical connection therewith so that current will flow from the secondary to the conducting block 34. Preferably the upper contact for the work which is carried by the conducting block 34, is of circular form and free to revolve so as to present a new surface to the work as it is progressively fed into engagement with it by the travel of the carriage 9. The rotary movement of the upper contact is attained as follows:

A spindle 38 of conducting material is journaled in the block 34 and free to rotate therein but is secured against longitudinal movement by a shoulder 38' engaging the front face of the block 34 and a collar 39 bearing against the rear face of the said block and secured to the spindle by a nut 40. The other end of the spindle is provided with a disk 50 to which is secured the upper contact preferably in the form of a ring 41, the edge of which is located directly above the contact shoe 24 of the work support or mandrel 23. When the work, located between the contact-shoe 24 and the contact ring 41 is progressively fed through the machine by means of the travel of the carriage 9, the heating current passes from the contact ring 41 to the contact-shoe 24 or work-holder 23 through the work, the contact-ring 41 being rotated in the block 34 by the travel of the work-holder. The upper contact 41 is preferably made in the form of a ring fitted to the spindle 38 and having its inner periphery bearing on a hub formed on or secured to the disk 50 as shown so that when it is desired to replace it, owing to wear or damage, less new material will have to be employed than if the contact was made as a solid plate, and also by this construction the contact proper has a more solid bearing and the jar does not tend to loosen or break the fastening screws. The ordinary wear of the edge of the roller contact 41 is taken up by adjusting the position of the block 34 by means of the nuts 36 as previously described.

The slide 33 carrying the roller contact 41 moves vertically, or transversely to the line of travel of the work-holder 23, to cause the contact 41 to engage, or be disengaged from, the work and is supported in the following manner. The upper part of the slide 33 is provided with a rearwardly projecting boss 42 to which is secured a stud 43. A rock-shaft 45 journaled in the bracket 30 has a lever 44 keyed to one end thereof. The free end of the lever engages the lower end of the stud 43 and carries and supports the slide 33 and its attendant parts. A lever 46 keyed to the other end of the rock-shaft 45 is connected by a pivoted link 47 with mechanism controlled by the travel of the carriage 9 and adapted to rock the shaft 45 to cause the lever 44 to raise the slide 33 or to permit it to drop, which controlling mechanism will be hereinafter described.

When the end of the lever 44 is depressed to permit the slide 33 to drop to cause the roller contact 41 to engage the work, the slide 33 drops due partly to the weight of the parts carried by it and also by the action of a spring 48 compressed between the slide 33 and the bracket 30, the force exerted by the spring being adjusted by a regulating screw 49. By means of this spring pressure, as soon as the slide 33 is released by the depressing of the lever 44, the slide will immediately be forced down to cause the contact 41 to engage the work, the suddenness of the descent being regulated by the screw 49. The spring 48 also supplies the welding pressure to the contact roller 41 which pressure might be varied according to the kind of work, or as desired, by the regulating screw 49. When the end of the lever 44 is raised, the slide 33 and contact 41 are drawn up from the work against the action of the spring 48 which is again compressed and stores energy to force the contact down when again released.

As the current is conducted from the block 34 to the roller contact 41 by means of the contact of the spindle 38 with the block 34 and as the amount of current which reaches the roller contact will therefore depend upon the accuracy of the bearing between the spindle and block which bearing is apt to become worn, it is preferable to provide a direct connection between the block 34 or secondary 7 and the roller-contact to prevent sparking and thereby destroying the bearing and also to insure that the full current will be transmitted. This connection operates as a shunt around the roller bearing and consists of a brush 51 constructed preferably of copper ribbons bearing on the periphery of the disk 50, see Fig. 18, and mounted on a bracket 52 secured to the block 34 in electrical connection therewith.

53 indicates a blade spring secured to a support 54 pivotally mounted on the bracket 52 and carries a mass of cleaning material 55 such as fine emery, or other suitable material which is adapted to rub on the contact edge of the ring 41 to wipe off any dirt and to keep the contact edge clean and bright to insure a perfect contact with the work. The amount of pressure between the cleaner 55 and the edge of the contact 41 is regulated by a screw 56 secured to the bracket 52 and operating on the support 54.

The mechanism for adjusting the overlapping edges of the work, if a lap weld is desired, and the mechanism for clamping the work on the support or mandrel 23 will now be described and for the purpose of more clearly showing the construction we will refer more particularly to Figs. 19, 21, 22, 23 and 24.

57 and 58 indicate brackets mounted on the carriage 9, suitably insulated therefrom and adapted to travel with the carriage. The brackets are located one on either side of the work-holder or mandrel 23 and on each is mounted the locating stops and clamps for the work. As each bracket is similar to the other and both carry similar devices operating in the same way, but one of them with its attendant mechanism will be described, it being understood that the description will apply to both.

59 indicates a rock-shaft journaled on eccentric pivots 61 in supports 60 rising from the bracket 58. The forward pivot 61 projects somewhat beyond the support 60 and to it an operating handle or lever 62 is secured for rocking the shaft 59. A rack 63, loosely mounted on the rock-shaft 59 between the supports 60, is provided with a number of laterally projecting locating stops or fingers 64 which are movable transversely onto the mandrel or work-holder 23 to adjust the edge of the work by means of the handle 62. The stops or fingers 64 are preferably spaced apart and of sufficient number to provide an abutment against which the entire edge of the work strikes, the stops being withdrawn by a reverse movement of the handle or lever 62. Any suitable means for limiting and varying the amount of transverse movement of the stops 64 might be employed but we prefer to employ for this purpose, an adjustable stop 65 secured to the support 60, which when the lever 62 is brought over to move the stops 64 into adjusted position will strike a laterally projecting lug 66 secured to the lever 62 and prevent further movement of the lever. In the reverse movement, the stops or fingers 64 are preferably brought to rest by the lever striking a pin 67 projecting laterally from the support 60.

The mechanism for clamping the edge of the work after it has been adjusted by means of the locating fingers 64 consists preferably of a clamping lever made up of a number of clamping devices or fingers 68 fulcrumed on a shaft 69 secured to the supports 60. The clamping devices are located parallel with the adjusted edge of the work or the line of the seam, and preferably enter the spaces between the locating fingers 64, a sufficient number of them being provided to engage the work along the entire length of the seam or edge. The clamping fingers 68 are brought into clamping position to grip and hold the work between them and the work-support 23 by means of a clamping screw 70 bearing on the bracket 58 and operating on an arm 71 of the clamping lever. By turning the screw 70 in one direction, the arm 71 will be forced up and the clamping fingers 68 pressed on the work, while to release the work, the screw 70 is turned in the reverse direction.

72 indicates a spring coiled around the rock-shaft 59, one end of which bears upon the locating fingers 64 to keep them pressed against the mandrel 23 or on the work, while the other end bears on the arm 71 and works against the action of the clamping screw to force the clamping fingers or lever away from the work when the clamping screw 70 is released, the spring acting to keep the end of the screw 70 pressed against its seat on the bracket 58.

When the two edges of the work are clamped by the opposite sets of clamping fingers 68 and the work is progressively fed into engagement with the roller contact 41 by the travel of the carriage 9, the contact 41 engages and travels along the work in the space between the clamping fingers 68, the locating stops 64 having been previously withdrawn.

We will now describe the driving mechanism for causing the work to be progressively fed into engagement with the roller contact, together with the automatic stopping of the feeding operation and the devices for returning the carriage to its original position, after which the mechanism for raising the roller contact free from the work will be described and then the devices for automatically controlling the flow of heating current through the work.

Referring more particularly to Figs. 3, 4, 5, 17, 25, 26, 27, 28, 29 and 30, the driving shaft indicated at 73 is arranged transversely to the line of travel of the carriage and is suitably mounted in bearings secured to the frames 2, 3. The said shaft is preferably continuously rotated by any suitable means and mechanism but is herein shown as receiving its power from a counter-shaft 74 to which is secured an ordinary belt-pulley 75. A pinion 76 fast upon the counter-shaft 74 meshes with a gear wheel 77 mounted on a stud 78 secured to the frame of the machine. A gear wheel 79 keyed to the end of the driving shaft 73 meshes with a pinion 80 secured to the gear wheel 77, by which train of gears the gear wheel 79 continuously revolves the driving shaft 73 as long as the belt or other driving power is coupled to the counter-shaft 74.

81 indicates a toothed rack secured to the underneath side of the carriage 9 and located longitudinally therewith in the opening 11 in the table 1. The teeth of said rack depend from it and are continuously in mesh with the teeth of a gear-wheel 82 loosely mounted on the driving shaft 73 but suitably prevented from longitudinal displacement thereon.

Any suitable form of clutch for coupling the gear-wheel 82 to the driving shaft 73 might be used but we prefer to employ a clutch in which the two members engage each other by the meshing of laterally projecting teeth secured to each member of the clutch as by this construction great strength is obtained and there is no liability of the clutch slipping. Preferably the clutch employed, and hereinafter termed the power-clutch, consists of a fixed member 83 which rotates with the shaft 73 but is free to move longitudinally on a feather thereon to cause it to engage the other or loose member of the clutch. A toothed disk 84 secured to the face of the member 83 is adapted to mesh with a similar toothed disk 85 secured to the gear wheel 82, forming the loose member of the clutch, when the fixed member 83 is moved longitudinally thereto, which engagement causes the gear wheel 82 to be coupled to the driving shaft. A forked lever 86 provided with pins 87 engaging a groove in the periphery of the fixed clutch member 83 is keyed to a rock-shaft 88 mounted in bearings in a bracket 89 secured to a convenient part of the frame, so that by rocking the shaft 88, the members of the clutch are either coupled or uncoupled according to the direction of rotation or rocking of the shaft 88, the clutch member 83 being limited in its uncoupling movement by striking the frame 3. A tension spring 90 secured to the frame of the machine and an arm 91 secured to the lever 86 normally tends to uncouple the clutch by drawing the member 83 backward.

When it is desired to connect the carriage 9 to the driving power, the shaft 88 is rocked to couple the members of the clutch by the following mechanism: An arm 92 keyed to the rock-shaft 88 is pivotally connected to an operating rod 93 by a link 94, said operating rod being supported in bearings formed in a bracket 95. If the rod 93 is pulled down the shaft 88 will be rocked and cause the lever 86 to force the two members of the clutch together against the action of the spring 90. A bell-crank lever 96 pivotally mounted on a bracket 97 carries on one arm a pivoted latch 98 which engages a collar 99 secured to the rod 93, the said latch being normally held against said collar by a spring 100. The other arm of the bell-crank lever is connected by a pivoted link 101 to a foot treadle 102 pivotally mounted on a stud 103 secured to the frame. Upon pressing the foot treadle the rod 93 will be forced downward by the latch 98 and the collar 99 and the carriage 9 will be coupled to the driving shaft 73 through the clutch 83 as previously described. It is necessary to keep the treadle 102 pressed downward to prevent the clutch from disengaging, as if the treadle was released the operating rod 93 would be drawn upward by the rocking of the shaft 88 in the reverse direction due to the action of the spring 90 and the clutch would be uncoupled. However, means for automatically uncoupling the power clutch when the treadle is retained in depressed position is provided and will presently be described. When the treadle 102 is released it is drawn upward by the action of a spring 104, its upward movement being limited by a stop 105.

106 indicates a block or nut secured to the carriage 9 and adapted to travel with it, but capable of being adjusted longitudinally for different lengths of weld it might be desired to obtain. By adjusting the longitudinal position of this nut, the point at which the power-clutch is uncoupled can be varied, or in other words, the length of travel of the carriage determined. The nut 106 works in longitudinally disposed guides 108 and 113 secured to the carriage 9. An adjustment screw 109 having a threaded connection with the nut 106 is secured to the carriage 9, one end being supported in a lug 110 and the other end preferably journaled in a block 111 secured to the carriage 9. By turning the screw 109 by means of the head 112 the longitudinal position of the nut 106 can be varied.

114 indicates a lever for releasing the rod 93 from the latch 98 and is fixed to a shaft 115 journaled in a bearing secured to the frame 3. The lever 114 is located so that the end thereof will be in the path of, and struck by, a trip 116 secured to the nut 106 when the carriage travels sufficiently far for the trip to reach the lever 114. An arm 117 fixed to the shaft 115 is pivotally connected by a rod 119 and an arm 120 to a rock shaft 118 mounted in the bracket 97. The shaft 118 carries a cam 121 which, when the shaft is rocked engages the end of the latch 98 and forces the latch away from the collar 99 which releases the rock-shaft 88 and permits the spring 90 to uncouple the power-clutch, the parts taking the position shown in Fig. 30. When the carriage has traveled sufficiently far for the trip 116 to strike the lever 114, the lever 114 will be turned and actuate the rock shaft 118 to cause the cam 121 to release the rod 93 as above pointed out. As soon as the carriage starts its travel in the reverse direction to return to its initial position, the lever 114 is freed from the trip 116 and the rock-shaft 118 and its attendant parts return to their normal position by the action of a spring 122, the lever 114 normally remaining in position against the stop 123. By varying the distance between the trip 116 and the lever 114 by means of the adjustment nut 106, the amount of travel of the carriage 9 can be increased or decreased as desired, as the forward movement of the carriage will continue until the trip 116 strikes the releasing lever 114. Upon releasing the treadle 102, the catch 98 will return to the position shown in Fig. 25.

To insure the immediate uncoupling of the power-clutch when the rod 93 is released, it is desirable to supply additional means for positively driving the members of the clutch apart, as it is difficult to obtain a spring sufficiently powerful to wrench the two members of the clutch apart abruptly enough. To provide this additional positive means, an arm 124 pinned to the rock-shaft 88 is provided with a roller 125. A cam 126 secured to the rock-shaft 118 engages the roller 125 when the shaft 118 is turned by the operation of the release lever 114 and rocks the shaft 88 which starts the clutch member 83 from its coöperating member, after which the spring draws the member 83 farther away from the member 85. While we prefer to employ the above device to start the uncoupling of the clutch, we do not limit ourselves to its employment, as it is possible to uncouple the clutch by the action of the spring alone, although quick action can be more depended upon by employing the above described means.

Having described the mechanism for automatically stopping the forward travel of the carriage, we will now describe the means for returning the carriage to its initial position and refer more particularly to Figs. 6, 7, 17 and 28.

A sprocket-wheel 127 secured to the gear-wheel 82, which meshes with the driving rack 81, and located between it and the frame 2, is connected by a sprocket chain 128 to a sprocket-wheel 129 loosely mounted on a shaft 130 disposed parallel to the driving shaft 73. A gear wheel 131 fixed to the shaft 130 is actuated by a pinion 132 in mesh therewith, said pinion being mounted on a stud secured to the table 1 and provided with a crank-handle 133. When it is desired to rotate the shaft 130, the rotation is effected by turning the handle 133 which rotates the shaft 130 through pinion 132 and gear 131. To couple the loosely mounted sprocket 129 to the shaft 130, a toothed disk 134 secured to the sprocket 129 is engaged by the teeth of a similar disk 135 secured to a fixed clutch member 136 when the said fixed clutch member is moved longitudinally toward it.

137 indicates a foot treadle connected by a pivoted rod 138 to one arm of a pivotally mounted forked lever 139. The forked lever is provided with suitable pins which engage a groove in the periphery of the fixed clutch member and by pressing the foot treadle 137 the clutch member 136 is moved into engagement with the member 134 and the sprocket 129 is coupled to the shaft 130. Upon releasing the foot treadle the clutch members are uncoupled by the action of a spring 140 acting on the clutch operating lever 139, the movement of the clutch member 136 being limited by a suitable stop such as a collar 141 secured to the shaft 130. When the sprocket wheel 129 is coupled to the shaft 130 by means of the clutch members 134, 135 and the shaft rotated by the crank handle 133 in the proper direction, the gear wheel 82 will be rotated by the chain 128 and sprocket 127 to return the carriage to its normal position through the connection of the gear wheel 82 with the rack 81 secured to the carriage 9.

The return of the carriage 9 is effected as above described while the driving shaft 73 is rotating, as the gear 82 is loose on the shaft 73 when it is desired to return the carriage. When the gear-wheel 82 is coupled to the shaft 73 to propel the carriage forward, the sprocket wheels 127 and 129 will rotate with it, but this rotation will not affect the shaft 130 as the sprocket 129 is at that time loose upon the shaft.

We will now describe the mechanism for lowering and raising the roller contact 41 into and out of position to engage the work, the said lowering and raising being automatically controlled by the travel of the carriage 9 or work-holder 23. As more clearly illustrating the mechanism we will refer particularly to the detail views, Figs. 3, 4, 5 and 10.

142 indicates a lever by whose movements the roller contact 41 is raised or is permitted to drop through the action of the spring 48 and weight of the parts as previously described. The lever 142 is mounted on a stud 143 secured to a suitable part of the frame of the machine and is provided with a depending arm 144 pivotally connected to an arm 145 by a link 146. The arm 145 is mounted on a rock-shaft 147 which also carries an arm 148 to which the link 47 is pivoted. The link 47 being connected with the contact raising lever 44 as previously described, it will be noted that any movement of the lever 142 about its pivot 143 will cause the lever 44 to either raise the slide 33 or permit it to drop. One arm of the lever 142 is provided with a cam roll or follower 149 and the other arm is provided with a shoulder 150 which is adapted to be engaged by a pivoted latch 151. If the cam follower 149 rises, the roller contact 41 is permitted to drop to engage the work. Normally when the machine is not doing any work, the cam roll 149 is prevented from rising by a solid obstruction against which it rests. This obstruction is preferably part of or secured to the carriage 9 so that when the carriage starts to travel the obstruction will be removed (by traveling with the carriage) and permit the cam-roll on the lever 142 to rise and the contact-roll 41 to drop. The obstruction preferably consists of a plate 152 rigidly secured to the carriage 9 and provided with a face cam 153. The cam-roll 149 normally rests on the rise of the cam 153 but when the carriage starts forward, the cam-roll is released and permits the arm of the lever 142 carrying the cam-roll to rise due to the withdrawing of the obstruction and the descent of the slide 33 and roller contact 41. A plate 154, provided with a face cam 155, secured to the adjustment nut 106 engages the cam-roll 149 upon the further movement of the carriage, depresses the lever 142 and thus raises the roller contact 41. When the lever 142 is engaged by the cam 155 and depressed, the latch 151 engages the shoulder 150 by the action of the spring 156 and prevents the free end of the lever 142 from rising, and consequently the roller contact from descending, when the roll 149 has been freed from the cam 155 by the return movement of the carriage.

The cam 155 is preferably higher than the cam 153 and of such height that when it strikes the cam-roll 149 the latch 151 will be forced under the shoulder 150 by the action of the spring 156. When, by the return movement of the carriage, the lever 142 is freed by the trip 157, the cam-roll 149 will rise until it is stopped by the cam 153 which however is a higher point than that at which it rested when engaged by the cam 155. This increased height of the cam-roll 149 permits the shoulder to drop sufficiently so that when the carriage again starts on its forward travel, the latch 151 will not be permitted to engage the shoulder 150 and thus prevent the descent of the roller contact.

A trip 157 secured to the carriage 9 engages and trips the latch 151 on the completion of the return movement of the carriage, the contact 41 being then prevented from descending by the engagement of the roll 149 with the cam 153. By releasing the lever 142 from the influence of the latch, it again becomes free to rise when the cam 153 has been removed by the next forward movement of the carriage.

By mounting the contact raising cam 155 on the adjustment nut 106, the length of engagement of the roller contact with the work can be varied to accommodate the machine for different lengths of weld.

It will be obvious that the heating current should begin to flow through the work as soon as the roller contact engages the work and should be broken off immediately before or at the instant the contact rises free of the work. As it would be practically impossible to close the circuit by hand at exactly the right instant when it is desired to start the weld and also to break the circuit at the correct moment, the making and breaking of the circuit controlling the flow of heating current to the work is automatically brought about by, and dependent upon, the travel of the carriage.

Referring to Figs. 3, 4, 5, 13, 14, 15 and 16 as giving the clearest illustrations of the circuit controlling devices, the circuit controller proper might be any suitable type of switch preferably located in the primary circuit so that, upon opening the switch the primary circuit is broken and thus the flow through the secondary is stopped.

The circuit-breaker or controller is supported on a table 158 secured to the base of the machine. 159 indicates the lever for making and breaking the circuit and is pivotally mounted on a bracket 160 rising from a base 161 secured to the table 158. A contact 162 is secured to, but suitably insulated from, the end of the lever 159 and is introduced into the electric circuit by means of a wire 163 secured thereto. The contact 162 is adapted to engage a fixed contact 164 secured to a binding post 165 by a lead 166 preferably formed of a number of thin strips of sheet copper so that the contact 164 will be capable of yielding slightly to the pressure of the contact 162 when brought into engagement with it. A spring 167 acts on the contact 164 to keep it pressed against the contact 162, a stop 168 limiting the action of the spring 167 when the contact 162 has been withdrawn. The binding post 165 is secured to and insulated from the base 161 and forms the terminal of the other end of the circuit wire 169.

The closing lever 159 is provided with an arm 170 pivotally connected with an arm of a bell-crank lever 171 by a link 172, said bell-crank lever being pivotally mounted on the bracket 160. A spring 173 preferably acting on the bell-crank 171 tends to close the contact of the lever 159 on the contact 164 and start the flow of current but is restrained from so acting at all times except when it is desired to pass the heating current through the work by the following mechanism: 174 indicates a bell-crank lever pivotally mounted as at 175 to a frame of the machine or a bracket secured thereto, and is connected to the lever 171 by a pivoted link 176. The short arm 177 of the lever 174 is provided with a ledge or projection 178 (see Fig. 14) which, when the carriage is at rest and in its initial position, is engaged by a stop 179 to hold the circuit-breaker in open position against the action of the spring 173. The stop 179 is secured to the carriage 9 so that as the carriage travels forward the arm 177 of the bell-crank 174 is freed from the stop 179 and the circuit controller is closed by the spring 173. The bell-crank 174 is provided with a vertical projection 180 secured to the arm 177 which, upon the carriage traveling forward is hit by a trip 181 mounted on the adjustment nut 106 which action by the trip 181 breaks the circuit by resetting the crank lever 174. When the arm 177 is depressed by the trip 181, a pivoted latch 182 engages the ledge 178 by the action of a spring 183. The circuit controller is now held in open position by means of the latch 182 during the return movement of the carriage.

When the carriage returns to its initial position, the side of the stop 179 strikes the latch 182 and acts as a trip to free the crank lever 174 from the latch 182, the crank lever being now held by the stop 179 and the circuit broken until the carriage begins its forward movement again.

When the bell-crank lever 174 is freed from the latch 182 by the trip 179, the arm 177 is permitted to rise a trifle due to the fact that the lower edge or stop of the trip 179 is higher than the shoulder on the latch 182 so that when the carriage again starts on its forward movement the latch 182 will merely rest against the side of the ledge 178 and not be permitted to engage the ledge. Obviously the trip 181 depresses the arm 177 sufficiently far so that the latch 182 is permitted to engage the ledge 178.

The trip 116 for automatically uncoupling the clutch and stopping the travel of the carriage and work-support, the cam 155 for raising the roller contact away from the work and the trip 181 for breaking the circuit are all mounted on the adjustment nut 106 in definite relation to one another as will presently appear in the description of the general operation of the machine and so that any adjustment or varying of the position of the nut 106 will vary all steps in the operation to the same extent.

The general operation of the apparatus, assuming that a lap seam is to be welded, is as follows: When the machine is at rest and the carriage 9 and the work-holder 23 in their initial position, the various devices are in the positions indicated in the following figures. The power-clutch is in the position shown in Fig. 28, the foot-treadle for the same and the automatic release parts in the positions shown in Fig. 25; the contact raising mechanism in the position shown in Fig. 3; the circuit controlling devices in the positions shown in Figs. 3 and 13 and the hand clutch and foot treadle therefor, for returning the carriage, in the positions shown in Figs. 6 and 7. The driving shaft 73 is continuously rotating by the power transmitted to it from the pulley 75 through the intermediate gears and pinions.

The work, indicated at 200, is placed on the mandrel or support 23 preferably by slipping it over the end thereof, the post 25 being assumed to have been previously removed from its supporting position to permit the withdrawal of the last finished piece. After placing the work on the mandrel, the post 25 is snapped in place to support the free end of the mandrel. The operator then brings one set of locating stops 64 into forward position on the mandrel and the edge of the work 200 abutted against them as shown in Fig. 21. This adjusted edge of the work is then clamped by forcing the clamping fingers 68 onto the work by the clamping screw 70, after which the locating stops 64 are withdrawn. The opposite set of locating stops is then brought into its forward position and the second edge of the work is brought over the already adjusted and clamped edge and against the locating stops. The second adjusted edge is then clamped by the opposite set of clamping fingers, after which the second set of locating stops is withdrawn from the edge by the handle secured to the eccentrically mounted shaft 72 as already described. The operator now presses the treadle 102 which draws down the rod 93 by means of the collar 99 and rocks the shaft 88 which forces the two members 84 and 85 of the power-clutch together and couples the driving gear 82 to the continuously rotating driving shaft 73. The carriage 9 by this action is propelled forward by means of its connection with the gear 82. As soon as the carriage starts its travel forward, the cam 153 is withdrawn from the cam roll 149 and the roller contact 41 is permitted to descend into engagement with the work 200 as previously described, the lever 142 having been previously released by the action of the trip 157 engaging the latch 151 on the return movement of the carriage.

At the instant the roller contact 41 comes down upon the work, the trip or stop 179 has traveled sufficiently far to release the bell crank lever 174 and the circuit controller is closed by the action of the spring 173. The carriage is now traveling forward and progressively feeding the seam to the roller contact 41, the circuit being closed and the heating current flowing from one terminal of the flexible secondary of the transformer to the roller contact 41, through the seam of the work to the work-holder or mandrel 23 and back to the other terminal of the transformer secondary. As the seam is progressively fed to the contact 41, the contact travels along the seam between the two sets of clamping fingers 68 and the welding of the seam continues until the trip 181 strikes the vertical projections 180 on the arm 177 which depresses the end of the arm 177 and breaks the circuit by opening the circuit controller as shown in Fig. 16, the latch 182 immediately engaging the ledge 178 by the action of the spring 183. An instant after, or it might be at the same time that the circuit is broken, the cam 155 reaches the cam-roll 149 on the contact-raising lever 142, depresses the end of said lever and the contact 41 is lifted away from the work and at the same time the latch 151 springs under the shoulder 150 as shown in Fig. 5 and is prepared to hold the lever 142 when said lever is freed from the cam 155 by the return movement of the carriage.

Immediately after the circuit is broken and at the instant the cam-roll 149 is engaged by the shoulder of the cam surface 155, the trip 116 strikes the lever 114 which rocks the shaft 118 and causes the cam 121 to strike the latch 98 and free the collar 99 from its influence. At the instant the collar 99 is freed from the latch the cam 126 strikes the roller 125 and rocks the shaft 130

88 which separates the power-clutch member 84 from the member 85 after which the spring 90 draws the member 84 completely away and the carriage stops, this position of the releasing mechanism being shown in Fig. 30.

It is necessary for the operator to keep the treadle 102 pressed during the forward travel of the carriage but when it has been automatically brought to rest, he releases the treadle 102 which action permits the latch 98 to again spring over the collar 99 in position for again coupling the driving power, as shown in Fig. 25. The operator now presses the treadle 137 and couples the clutch members 134 and 135 and therefore the sprocket wheel 129 to the shaft 130. He then turns the crank-handle 133 and returns the carriage 9 to its initial position by means of pinion 132, gear 131, sprocket 129, chain 128, sprocket 127, gear 82 and rack 81 after which the work is unclamped and removed from the mandrel 23.

Upon the return movement of the carriage, the circuit controller is held in open position by the latch 182 and the contact 41 is held in raised position by the latch 151. Immediately before the carriage has finished its return movement, the arm 177 is freed from the latch 182 by the trip 179 which then, for the time being, acts as a stop to keep the circuit open until the carriage again starts forward, the latch 182 being tripped to permit the arm 177 to rise as soon as the carriage starts forward. Also at the end of the return movement of the carriage the lever 142 is freed from the latch 151 by the trip 157 but the contact is temporarily held in raised position by the cam surface 153 until the carriage again starts forward.

The adjustment nut 106 carrying the actuating devices for the contact-raising, circuit-breaking, and clutch releasing is adjusted to any position according to the length of weld desired by turning the screw 109 by means of head 112.

It will be understood that our invention is not limited to the single application of it as herein shown and described nor to the specific details employed, but is capable of various uses and modifications in the details without departing from the spirit of our invention as defined in the appended claims.

What we claim as our invention is:—

1. In an electric metal working apparatus, the combination of a transformer secondary, a contact mounted on one terminal thereof, a traveling work support of conducting material adapted to carry the work beneath the first named contact so as to cause the same to progressively engage the parts to be heated and means for maintaining the electrical connection between the traveling support and the opposite terminal of the secondary.

2. In an electric metal working apparatus, the combination of a transformer secondary, a contact mounted on one terminal thereof, a traveling mandrel permanently supported at one end and adapted to carry the work beneath the first named contact so as to cause the same to progressively engage the parts to be heated, means for maintaining the electrical connection between the mandrel and the opposite terminal of the secondary and detachable means for supporting the free end of said mandrel.

3. In an electric metal working apparatus, the combination of a transformer secondary, a contact mounted on one terminal thereof, a traveling carriage, a mandrel permanently supported on said carriage at one end and adapted to carry the work beneath the first named contact so as to cause the same to progressively engage the parts to be heated, means for maintaining the electrical connection between the mandrel and the opposite terminal of the secondary and a support secured to said carriage and adapted to detachably engage the free end of said mandrel.

4. In an electric metal working apparatus, the combination of a transformer secondary, a contact mounted on one terminal thereof, ways connected to the other terminal a traveling work support adapted to feed the work progressively beneath said contact and a slide electrically united with the work support and sliding on the ways connected to the opposite terminal of said secondary.

5. In an electric metal working apparatus, the combination of a transformer secondary, a contact roller mounted on one terminal thereof, a traveling and conducting work support adapted to feed the work progressively beneath the roller contact and means for maintaining electrical connection between said conducting support and the opposite terminal of said secondary.

6. In an electric metal working apparatus, the combination of a transformer secondary, a contact roller mounted on one terminal thereof, a traveling and conducting work support adapted to feed the work progressively beneath the roller contact, roller-bearings of conducting material in electrical connection with the opposite terminal of said secondary and a slide electrically united with the work support and adapted to slide on said roller bearings.

7. In an electric metal working apparatus, the combination of a transformer secondary, a contact roller mounted on one terminal thereof, a traveling and conducting work support adapted to feed the work progressively beneath the roller contact, roller bearings of conducting material in electrical connection with the opposite terminal of said secondary, a slide electrically united with the work support and adapted to slide on said roller-bearings and means adapted to press said slide on said rollers.

8. In an electric metal working apparatus, the combination of a transformer secondary, a contact roller mounted on one terminal thereof, a traveling and conducting work support adapted to feed the work progressively beneath the roller contact, roller bearings of conducting material in electric connection with the opposite terminal of said secondary, a slide electrically united with the work support and adapted to slide on said roller bearings and also adapted to slide on said work support transversely to said roller bearings and a spring adapted to press said slide on said roller bearings.

9. In an electric metal working apparatus, the combination of a transformer secondary, a roller contact adapted to be rotated to progressively engage the work, a slide electrically united with one terminal of said secondary and provided with a bearing in which said contact rotates, said contact receiving electric current through said bearing and a direct electric connection from said slide to said contact around said bearing.

10. In an electric metal working apparatus, the combination of a transformer secondary, a roller contact adapted to be rotated to progressively engage the work, a slide movable transversely to the work and electrically united with one terminal of said secondary and provided with a bearing in which said contact rotates, said contact receiving electric current through said bearing and a conducting brush adapted to establish direct electric connection between said slide and said contact around said bearing.

11. In an electric metal working apparatus, the combination of a transformer secondary, a contact connected to one terminal thereof, a traveling work support adapted to feed the work progressively beneath said contact and provided with means for maintaining electrical connection with the opposite terminal of the secondary and means for automatically disengaging the contact from the work when the traveling support completes its movement.

12. The combination of a transformer secondary having a flexible terminal, a contact mounted on said flexible terminal, means for feeding the work progressively beneath said contact and means for automatically raising the contact from engagement with the work at the completion of the feeding operation.

13. In an electric metal working apparatus, the combination of a traveling work support having a conducting surface, means for maintaining electrical connection between the same and a source of energy, means for clamping the work down upon the conducting surface of said support, a contact movable transversely with respect to the line of travel of the support and means connected with the support for automatically removing said contact from engagement with the work, as and for the purpose described.

14. In an electric metal working apparatus, the combination with a source of energy of a contact connected with one terminal of said source and adapted to feed current into the work, a traveling work support adapted to feed the work progressively into engagement with said contact, and a cam block carried by the support and adapted to lift the contact out of engagement with the work.

15. In an electric metal working apparatus, the combination with a source of energy of a contact connected with one terminal of said source and adapted to feed current into the work, a traveling work support adapted to feed the work progressively into engagement with said contact, a cam block carried by the support and adapted to lift the contact out of engagement with the work on completion of the travel in one direction and means for holding said contact lifted during the travel of the support in the opposite direction.

16. The combination, substantially as described, of an electric contact adapted to feed current into the work, a traveling work support, a cam block moving therewith and adapted to lift the contact from engagement with the work on completion of the travel in one direction, a latch for holding the contact lifted and a trip for releasing the latch when the support nears the end of its travel in the opposite direction.

17. The combination, substantially as described, of an electric contact adapted to engage and feed current into the work and movable into and out of engaging position, feeding mechanism for feeding the work progressively into engagement with said contact and means carried by said feeding mechanism and operating on said contact for controlling the movement thereof into and out of engaging position.

18. In an electric metal working apparatus, the combination of a current feeding contact adjustable into and out of engagement with the work, means for feeding the work past said contact and means connected therewith for automatically withdrawing the contact when the feed movement has progressed to a predetermined point.

19. In an electric metal working apparatus, the combination of a current feeding contact adapted to be brought into and out of engagement with the work, a traveling work support adapted to feed the work past said contact and a cam moving with the work-support for lifting the contact out of engagement with the work.

20. In an electric metal working apparatus, the combination, with a flexible transformer secondary, of a roller contact mounted on said secondary, a traveling contact affording a support for the work and provided with means for clamping the work down upon it and means connected with said traveling contact for lifting the roller contact from engagement with the work, as and for the purpose described.

21. In an electric metal working apparatus, the combination, with a flexible transformer secondary, of a roller contact adapted to move transversely to the work and to feed current into the work and a conducting slide forming one terminal of said secondary and carrying said roller contact, said slide moving to and from the work during the transverse movements of said contact in the normal operation of the apparatus.

22. In an electric metal working apparatus, the combination, with a flexible transformer secondary, of a traveling work support, a conducting slide adapted to move transversely to the travel of said work support and forming one terminal of said secondary, a roller contact adapted to feed current into the work and carried by said slide and a spring adapted to press said contact on said work.

23. In an electric metal working apparatus, the combination with a flexible transformer secondary, of a slide, a conducting block forming one terminal of said secondary and secured to and forming part of said slide, a roller contact adapted to feed current into the work and carried by said block and means for adjusting the position of said contact with relation to said slide.

24. In an electric metal working apparatus, the combination, substantially as described, of an electric contact adapted to feed current into the work and movable into and out of engagement therewith, means for feeding the work progressively into engagement with said contact, a cam connected with the feeding devices for lifting the contact when the feeding mechanism has moved to a predetermined extent in one direction, a latch for holding the contact in lifted position, and means for automatically disengaging the latch when the feeding devices are drawn back to position for a new operation.

25. The combination, substantially as described, of a movable support a roller contact mounted on said support, a work support, a carriage for feeding the work support past the roller contact, a cam on said carriage for lifting said contact from engagement with the work, a latch for holding the same lifted, a trip for releasing the latch on reverse movement of the carriage and a cam block adapted to temporarily hold the contact in lifted position after release of the latch but to permit the contact to be lowered as soon as the carriage begins its forward movement.

26. In an electric metal working apparatus, the combination, substantially as described, of a roller contact, a flexible transformer secondary fitted with a terminal block for carrying said roller contact, a guide for said block, lifting mechanism for lifting the block and contact out of engagement with the work, a carriage provided with a work support connected to the other terminal of the secondary, mechanism for feeding the carriage and work past the roller contact, and means connected with said carriage for automatically disconnecting the same from its driving power and for operating the lifting mechanism of said contact at the extreme of forward movement of the carriage.

27. In an electric metal working apparatus, the combination, substantially as described, of a flexible transformer secondary a roller contact connected to one terminal of said secondary lifting mechanism for lifting the contact out of engagement with the work, a carriage provided with a work support connected to the other terminal of the secondary, mechanism for feeding the carriage and work past the roller contact and means connected with said carriage for automatically disconnecting the same from its driving power at the extreme of forward movement of the carriage.

28. In an electric metal working apparatus, the combination, substantially as described, of a roller contact connected to one terminal of a transformer secondary, lifting mechanism for lifting the contact out of engagement with the work, a carriage provided with a work support connected to the other terminal of the secondary, mechanism for feeding the carriage and work support past the roller contact, means connected with said carriage for automatically disconnecting the same from its driving power and for operating the lifting mechanism of said contact at the extreme of forward movement of the carriage, a latch for holding the contact in lifted position, means for automatically disengaging the latch and means for holding the contact temporarily lifted when the latch is disengaged.

29. In an electric metal working apparatus, the combination, substantially as described, of a roller-contact, a flexible transformer secondary fitted with a terminal block for carrying said roller contact, a guide for said block, lifting mechanism for lifting the block and contact out of engagement with the work, a carriage provided with a work support connected to the other terminal of the secondary, mechanism for feeding the carriage and work support past the roller contact, means connected with said carriage for automatically disconnecting the same from its driving power and for operating the lifting mechanism of said contact at the extreme of forward movement of the carriage, a latch for holding the contact in lifted position, means for disengaging the latch automatically through reverse movement of the carriage, means for holding the contact temporarily lifted when the latch is disengaged, and means for lowering the contact when the carriage moves forward again.

30. In an electric metal working apparatus, the combination of a current feeding contact movable into and out of position for engaging the work, a latch for holding said contact disengaged from the work, work feeding devices, and a trip connected with said feeding devices and operating on said latch.

31. In an electric metal working apparatus, the combination of a current feeding contact movable into and out of position to engage the work, a latch for holding said contact in disengaged position, a trip for operating the latch and work feeding devices operating said trip to free the contact and provided also with means for lifting said contact and permitting it to be held in lifted position by the latch.

32. In an electric metal working apparatus, the combination of a current feeding contact, a latch for holding the same in inoperative position, work feeding devices provided with means for tripping the latch, and a cam block adapted to temporarily hold the contact after the latch is tripped but to free the contact when the work feeding devices resume their movement.

33. In an electric metal working apparatus, the combination of a current feeding contact, a latch for holding the same in inoperative position, a work support adapted to carry the work progressively past the contact and provided with means for tripping the latch, and means connected with the work support for holding the contact until the said support resumes its movement.

34. In an electric metal working apparatus, the combination of a current feeding contact adapted to engage the work and movable into and out of operative position, a movable work holder and means for automatically throwing the contact into inoperative position at a predetermined point in and controlled by the movement of the work holder.

35. In an electric metal working apparatus, the combination of a current feeding contact movable into and out of position for engaging the work, a movable work holder, means for throwing the contact into engaging position at the beginning of the forward movement of the work holder and means for automatically throwing the contact into disengaging position at the end of the forward movement of the work holder.

36. In an electric metal working apparatus, the combination of a movable support, a current feeding contact mounted on said support whereby the contact is brought into and out of position for engaging the work, a work support adapted to carry the work progressively into engagement with the contact and means for automatically throwing the contact out of engaging position at a predetermined point in the movement of the work support.

37. In an electric metal working apparatus, the combination of a movable current feeding contact movable into and out of position for engaging the work, a feed mechanism for feeding the work progressively into engagement with the contact, a driving shaft, a clutch connecting the feed mechanism with said driving shaft, a trip connected to the feed mechanism for disengaging the clutch and means also connected to the feed mechanism for throwing the contact out of engaging position.

38. In an electric metal working apparatus, the combination of a reciprocating work holder, a circuit controller, means connected with the work holder for causing the circuit controller to stop the flow of heating current at the termination of the movement of the work holder in one direction, and means connected with said work holder for resetting said circuit controller in position for starting the flow of heating current when the work holder is in its other extreme position.

39. The combination of a movable work holder, a circuit breaker, a latch for holding the circuit breaker in open position, means carried by the movable work holder for tripping the latch and means also carried by said work holder for resetting the circuit breaker in position for being detained by the latch.

40. In an electric metal working apparatus, the combination of a reciprocating work holder forming one of the electrodes for supplying current to the work, a circuit breaker, a latch, means carried by the work holder for releasing the latch to permit the circuit breaker to close circuit, and means carried by said work holder for operating the circuit breaker to cause it to open circuit.

41. In an electric metal working apparatus, the combination of a reciprocating work holder forming one of the electrodes for supplying current to the work, a circuit breaker and operating and controlling devices carried by the work holder for causing the circuit breaker to open circuit in one movement of the work holder and to close circuit in the reverse movement.

42. In an electric metal working apparatus the combination of a reciprocating work holder, a circuit breaker, a latch for detaining the circuit breaker, a trip carried by the work holder for operating said latch and freeing the circuit breaker and a projection carried by said work holder for restoring the circuit breaker to position for being held by the latch.

43. In an electric metal working apparatus, the combination with a reciprocating work-holder of a circuit breaker, a latch for holding the same in open position, a trip for freeing the circuit breaker from said latch preliminary to its assuming circuit closing position and for temporarily holding the circuit breaker when freed from the latch and until after the work holder has traveled a short distance and means carried by said work holder for throwing the circuit breaker into position for reëngagement by the latch when the work holder completes its forward movement.

44. In an electric metal working apparatus, the combination of a reciprocating work holder, a circuit breaker, a latch for holding said circuit breaker in open position, and means carried by the work holder for operating on the circuit breaker to cause the circuit breaker to open circuit and be held by said latch when the work holder completes its forward movement and means carried by the work-holder to establish circuit at its reverse or starting position.

45. In an electric metal working apparatus, the combination of a circuit breaker, a spring normally tending to close the circuit breaker, a latch for holding the circuit breaker in open position, a trip carried by the work holder for freeing the latch and means carried by said work holder for restoring the circuit breaker to open position at one point in the movement of the work holder.

46. In an electric metal working apparatus, the combination of a reciprocating work holder, a current-feeding contact, a drive shaft for advancing the same to bring the work progressively into engagement with the current feeding contact, a clutch for coupling said work-holder to said drive shaft, a circuit breaker, a trip carried by the work holder for freeing the clutch, and means also carried by said work holder for causing the circuit breaker to cut off the flow of working current when by the operation of the trip the said work holder is disconnected from the driving power.

47. In an electric metal working apparatus, the combination of a traveling work-support, driving means therefor, a contact movable into and out of position to engage the work, means for lifting the contact free of the work, a circuit controller, means for disconnecting said work support from the driving means and an adjustable block carried by said work-support, said block provided with means for automatically bringing into action the lifting mechanism for the contact, automatically breaking the circuit and automatically uncoupling the driving power.

48. In an electric metal working apparatus, the combination of a traveling work-support, driving power therefor, a contact movable into and out of position to engage the work, a circuit controller, means for automatically disconnecting said work support from the driving power, means for automatically opening said circuit controller, means for automatically lifting said contact free of the work after the circuit has been broken and means for adjusting the time of action of all the aforesaid means.

49. In an electric seam welder, the combination of a source of heating current, a traveling support adapted to support the whole length of seam and means for maintaining electrical connection between the support and the source of heating current during its travel.

50. In an electric seam welder, the combination of a source of heating current, a traveling support adapted to support the work the whole length of the seam, means for maintaining electric connection between the support and one pole of the source of heating current during the travel of the support and a stationary contact adapted to engage the work during its travel and connected to the other pole of the source.

51. In an electric seam welder, the combination of a source of heating current, a traveling support adapted to support the work the whole length of the seam, means for maintaining electric connection between the support and one pole of the source of heating current during the travel of the support and a roller contact adapted to engage the work during its travel and connected to the other pole of the source.

52. In an electric seam welder, the combination of a source of heating current, a traveling work supporting bed or platen of conducting material, means for clamping the work to said bed the whole length of the seam and means for maintaining electric connection between the bed and the source of the heating current during travel of the bed.

53. In an electric seam welder, the combination of a traveling support adapted to support the edges of the seam, a locating stop adapted to be engaged by an edge of the work when placed on the support and to be withdrawn from engagement after adjustment of the edge and clamping devices for clamping the work down in the adjusted position of the edge.

54. In an electric seam welder, the combination of a traveling support adapted to support the two edges of the seam for their whole length, locating stops mounted to travel with the support and adapted respectively to locate the opposite edges with respect to the line of weld and clamping devices for clamping the edges down upon the support after adjustment of said edges.

55. In an electric seam welder, two locating stops for the edges of the work, each consisting of a series of locating fingers combined with two series of intermediate clamping fingers each adapted to hold an edge down to its support after adjustment of said edge to position against an opposite set of locating fingers.

56. In an electric seam welder, the combination of a support adapted to sustain the whole length of seam to be welded, means for clamping the material with its edges overlapped upon said support and locating stops against which the edges of the material may be abutted to determine the extent of overlap, as and for the purpose described.

57. In an electric seam welder, the combination with the contact device for feeding current to the same, of a support adapted to sustain the material throughout the whole length of the seam to be formed, clamping devices for clamping the material with edges overlapped, and locating stops adapted to be engaged by said edges for determining the extent of overlap, said locating stops being mounted on suitable supports whereby they may be withdrawn to permit the application of the contact device.

58. In an electric seam welder, the combination of a support adapted to sustain the material throughout the whole length of the seam to be formed, clamping devices for clamping the material with edges overlapped, and eccentrically mounted locating stops adapted to be engaged by said edges for determining the extent of overlap.

59. In an electric seam welder, the combination of a support adapted to sustain the material throughout the whole length of the seam to be formed, clamping devices for securing the material on said support, a rock shaft having eccentric pivots, supports adapted to move with the work support, and in which said eccentric pivots are mounted, locating stops loosely mounted on said rock-shaft and an operating handle secured to one of said eccentric pivots whereby the said stops are brought into engagement with the edge of the work.

60. In an electric seam welder, the combination of a source of energy, a support of conducting material for the work connected to one pole of said source of energy, and adapted to sustain the edges to be united for their whole length, locating stops adapted to be engaged by the edges for determining the extent of overlap of said edges, clamping devices for holding the work down to the support at opposite sides of the seam to be formed, and an electric contact for feeding current to the work along the space between the clamping devices.

61. In an electric seam welder, the combination of a clamping device comprising a series of fingers adapted to engage the work near an edge thereof and a series of locating fingers for locating the position of the opposite edge, said locating fingers being adapted to enter the spaces between the fingers of said clamping device.

62. In an electric seam welder, the combination of a support for the work adapted to support the two edges to be welded for the whole extent of the seam to be formed, a locating stop comprising a series of fingers mounted on a rock shaft parallel to the seam and movable into and out of position for engagement by an edge of the work, and a clamping device comprising a series of clamping fingers at the opposite side of the line of the seam and adjustable into and out of position for clamping the adjusted edge.

63. In an electric seam welder, the combination of a support for the work adapted to support the two edges to be welded for the whole extent of the seam to be formed, a locating stop comprising a series of fingers mounted on a rock shaft parallel to the seam and movable into and out of position for engagement by an edge of the work, a clamping device comprising a series of clamping fingers adjustable transversely into and out of position for clamping the adjusted edge, and a set of fingers for locating the extent of overlap of the opposite edge.

64. The combination in a seam welder, of a traveling support, means for clamping the overlapped edges of the work upon said support, a transformer secondary, means for mantaining electrical connection between said support and one terminal of the transformer during the travel of said support and a contact roller connected to the opposite terminal and adapted to engage the work on a line running between the clamping devices for the opposite edges.

65. In an electric seam welder, the combination of a support for the work adapted to support the two edges to be welded for the whole length of the seam to be formed, a locating stop transversely movable into and out of position for engagement by an edge of the work and means for adjusting the amount of transverse movement of said stop.

66. In an electric seam welder, the combination of a support for the work adapted to support the two edges to be welded for the whole length of the seam to be formed, a locating stop transversely movable into position for engagement by an edge of the work and an adjustable stop for limiting the amount of transverse movement of the locating stop.

67. In an electric metal working apparatus, the combination of a circuit breaker, a spring normally tending to close the circuit breaker, a latch for holding the circuit breaker in open position, means carried by the work-holder for freeing the latch and holding the circuit breaker in open position at one point in the movement of the work-holder, the circuit breaker being freed from said means at a subsequent position of the work-holder and means for restoring the circuit breaker to open position at a further position of the work-holder.

68. In an electric metal working apparatus, the combination of a reciprocating work-holder forming an electrode for supplying current to the work, a circuit breaker, a latch therefor, means for operating on the circuit breaker and latch to cause the circuit breaker to open circuit when the work-holder completes its forward movement and means controlled by the work-holder to establish circuit at its reverse or starting position.

69. In an electric seam welder, the combination of a support for the work, a locating stop adapted to engage the edge of the work to determine the amount of overlap in the seam and adjustable means for varying the amount of said overlap.

70. In an electric seam welder, the combination of a support for the work, a lap determining device for fixing the amount of overlap in the seam, means for clamping the lapped work and means for adjusting said lap determining device to vary the amount of said overlap.

71. In an electric seam welder, the combination of a traveling support for the work, a locating stop transversely movable into and out of position for engaging an edge of the work and clamp devices for clamping the work in the adjusted position of the edge.

72. In an electric seam welding apparatus, the combination of a work-support forming an electrode for feeding current to the work, a lap determining device for fixing the amount of overlap in the seam and clamping means for holding the overlapped edges during welding.

73. In an electric seam welding apparatus, the combination of a work-support, a lap determining device transversely movable into and out of position, for adjusting an edge of the work, means for clamping the work on said support in the adjusted position of the edge and a carriage on which said clamping means are mounted.

74. In an electric seam welding apparatus, the combination of a work-support, locating stops transversely movable to respectively locate opposite edges of the work with respect to the line of weld and clamping devices for clamping the edges down upon the support after adjustment of said edges.

75. In an electric welding machine, a mandrel having a part forming an electrode, means for folding work portions in opposite directions over the mandrel with their adjacent ends lapping each other, and an electrode for coöperating with the electrode of the mandrel to weld together the lapping work ends.

76. In an electric welding machine, a mandrel, a movable electrode for coöperating with a part of said mandrel to weld the lapped ends of work thereover, and means movable to engage and clamp one end portion of the work to the mandrel without the point of weld and prior to the welding action.

77. In an electric welding machine, a mandrel having an electrode countersunk therein, and means for coöperating with said electrode to weld together the lapping ends of work shaped around the mandrel.

78. In an electric seam welding machine, a mandrel having a part forming an electrode, over which the work portion to be welded is folded or lapped, means for clamping the lapped portion on the mandrel and an electrode for coöperating with the electrode of the mandrel to weld together the lapping portions.

Signed at Stonington, in the county of New London and State of Connecticut, this seventeenth day of November, 1908.

ADOLPH F. RIETZEL.

Witnesses:
FRANK S. GALLIGAN,
ROSE H. RIETZEL.

Signed at Lynn, in the county of Essex and State of Massachusetts, this 6th day of November, 1908.

GEORGE E. BARSTOW.

Witnesses:
C. T. TISCHNER, Jr.,
W. H. HODGES.